US008447870B2

(12) United States Patent
Gagner et al.

(10) Patent No.: US 8,447,870 B2
(45) Date of Patent: May 21, 2013

(54) WIRELESS MESH NETWORKING IN WAGERING GAME ENVIRONMENTS

(75) Inventors: Mark B. Gagner, West Chicago, IL (US); Daniel Norman St. John, Crystal Lake, IL (US); Dale R. Buchholz, Palatine, IL (US)

(73) Assignee: WMS Gaming Inc., Waukegan, IL (US)

( * ) Notice: Subject to any disclaimer, the term of this patent is extended or adjusted under 35 U.S.C. 154(b) by 1257 days.

(21) Appl. No.: 11/996,092

(22) PCT Filed: Jul. 14, 2006

(86) PCT No.: PCT/US2006/027345

§ 371 (c)(1), (2), (4) Date: Jul. 14, 2008

(87) PCT Pub. No.: WO2007/011718

PCT Pub. Date: Jan. 25, 2007

(65) Prior Publication Data

US 2008/0300046 A1 Dec. 4, 2008

Related U.S. Application Data

(60) Provisional application No. 60/700,583, filed on Jul. 19, 2005, provisional application No. 60/715,947, filed on Sep. 9, 2005.

(51) Int. Cl.
*G06F 15/16* (2006.01)

(52) U.S. Cl.
USPC .............. 709/229; 709/203; 709/226; 463/29

(58) Field of Classification Search
USPC ............................ 709/203, 226, 229; 463/29
See application file for complete search history.

(56) References Cited

U.S. PATENT DOCUMENTS

| | | | | |
|---|---|---|---|---|
| 7,647,508 | B2 * | 1/2010 | Sood et al. | 713/193 |
| 7,676,231 | B2 * | 3/2010 | Demirhan et al. | 455/452.1 |
| 2003/0186745 | A1 | 10/2003 | Nguyen et al. | |
| 2003/0190958 | A1 | 10/2003 | Paulsen | |
| 2004/0162144 | A1 | 8/2004 | Loose et al. | |
| 2004/0248642 | A1 * | 12/2004 | Rothschild | 463/20 |
| 2005/0054438 | A1 * | 3/2005 | Rothschild et al. | 463/29 |
| 2005/0147057 | A1 * | 7/2005 | LaDue | 370/310 |
| 2006/0234719 | A1 * | 10/2006 | Demirhan et al. | 455/453 |
| 2008/0268959 | A1 * | 10/2008 | Bryson et al. | 463/42 |

OTHER PUBLICATIONS

"International Search Report for Application No. PCT/US2006/27345, date mailed May 8, 2007", 4 pgs.

.."Written Opinion of the International Searching Authority for Application No. PCT/US2006/27345, date mailed May 8, 2007", 5 pgs.

* cited by examiner

*Primary Examiner* — Khanh Dinh

(74) *Attorney, Agent, or Firm* — Schwegman Lundberg & Woessner, P.A.

(57) ABSTRACT

Systems and methods for wireless mesh networking in a gaming environment are described herein. In one embodiment, the system includes a network interface unit to wirelessly receive gaming data from ones of a plurality of components of a wireless mesh network, the network interface unit to wirelessly transmit the gaming data to others of the plurality of components of the wireless mesh network. The system also includes a memory unit to store certain of the gaming data and to store instructions for conducting wagering games and a central processing unit to perform operations based in part on the certain of the gaming data and to perform operations based on the instructions.

13 Claims, 17 Drawing Sheets

1304

| | | | | | | | |
|---|---|---|---|---|---|---|---|
| E | 1 | | | | | | |
| | | B | 2 | | | | |
| | | | | A | 3 | | |
| | | | | | | M | 4 |
| | | | | | | P | 4 |
| | | | | M | 3 | | |
| | | | | | | A | 4 |
| | | | | | | P | 4 |
| | | | | | | N | 4 |
| | | | | K | 3 | | |
| | | C | 2 | | | | |
| | | | | D | 3 | | |
| | | | | B | 3 | | |
| | | D | 2 | | | | |
| | | | | C | 3 | | |
| | | K | 2 | | | | |
| | | | | B | 3 | | |
| | | | | M | 3 | | |
| | | | | L | 3 | | |
| F | 1 | | | | | | |
| | | G | 2 | | | | |
| | | | | H | 3 | | |
| | | | | | | Y | 4 |

1306

| | | | | | | | | | |
|---|---|---|---|---|---|---|---|---|---|
| J | 1 | | | | | | | | |
| | | K | 2 | | | | | | |
| | | | | B | 3 | | | | |
| | | | | M | 3 | | | | |
| | | | | L | 3 | | | | |
| | | L | 2 | | | | | | |
| | | | | K | 3 | | | | |
| | | | | N | 3 | | | | |
| | | | | | | M | 4 | | |
| | | | | | | R | 4 | | |
| | | | | | | | | S | 5 |
| | | | | T | 3 | | | | |
| | | W | 2 | | | | | | |
| | | | | T | 3 | | | | |
| | | | | V | 3 | | | | |
| | | | | | | U | 4 | | |
| | | | | | | | | S | 5 |
| | | | | | | X | 4 | | |
| | | | | X | 3 | | | | |
| | | | | | | V | 4 | | |
| | | | | | | Y | 4 | | |
| | | | | Y | 3 | | | | |
| | | | | | | H | 4 | | |
| | | | | | | X | 4 | | |

1300

ASSUME THAT I IS THE CBG SERVER
AND THAT D, E, G, J, M, R IS THE SET OF EGMS.

THE PRIMARY ROUTES ARE:
E: 1 (NEIGHBOR)
J: 1 (NEIGHBOR)
D: 2 VIA E
G: 2 VIA F
M: 3 VIA E,B OR J,K
R: 4 VIA J,L,N

THE SECONDARY ROUTES ARE:
E: 3 VIA J,K
J: 3 VIA E,K
D: 3 VIA E,C
G: 5 VIA J,W,Y,H
M: 3 VIA J,K OR E,B
R: 5 VIA E,B,M,N

1404

1400

WIRELESS MESH NETWORKING IN WAGERING GAME ENVIRONMENTS

RELATED APPLICATIONS

This application is a U.S. National Stage Filing under 35 U.S.C. 371 from International Patent Application Serial No. PCT/US2006/027345, filed Jul. 14, 2006, and published on Jan. 25, 2007 as WO 2007/011718 A2, and republished as WO 2007/011718 A3, which claims the priority benefit of U.S. Provisional Application Ser. No. 60/700,583 filed Jul. 19, 2005 and U.S. Provisional Application Ser. No. 60/715,947 filed Sep. 9, 2005, the contents of which are incorporated herein by reference.

FIELD

This invention relates generally to the field of wagering game devices and more particularly to the field of connecting wagering game devices in a wireless mesh network.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

BACKGROUND

Description of Related Art

A wide variety of computerized wagering game devices (a.k.a. gaming devices) are now available to casino operators and players. Computerized gaming devices range from slot machines to games that are traditionally played live, such as poker, blackjack, roulette, etc. Computerized gaming devices can also include gaming servers and gaming controllers. These computerized gaming devices provide many benefits to game owners and players, including increased reliability over mechanical devices, greater game variety, improved sound and animation, and lower overall management cost.

Typically, in casinos, gaming devices are wired together to form wired gaming networks. Casinos can use wired gaming networks for conducting progressive jackpot games, collecting wagering game information, transmitting messages to players, etc.

FIG. 1 is a block diagram illustrating a wired gaming network. As shown in FIG. 1, the wired wagering game network 100 includes a network controller 102 connected to a plurality of switches 104. Each of the switches 104 is connected to a floor controller 106 and a plurality of gaming devices 108. In the wired gaming network 100, the switches 104 deliver communications to the various network components. For example, a switch 104 delivers messages from the network controller 102 to a floor controller 106 and it delivers messages from the floor controller 106 to the gaming devices 108. The switches 104 also deliver messages between the gaming devices 108. In order to deliver messages to the various network components, the switches 104 maintain routing information, such as network topology data, routing tables, etc. When technicians add new gaming devices to wired gaming networks, they typically wire the gaming devices into the network and manually reconfigure the routing information to reflect the new devices. Because all the network components are wired together, rearranging the gaming devices on the casino floor can be a difficult task.

BRIEF DESCRIPTION OF THE FIGURES

The present invention is illustrated by way of example and not limited to the Figures of the accompanying drawings in which.

OVERVIEW OF SOME EMBODIMENTS

Figure 1:
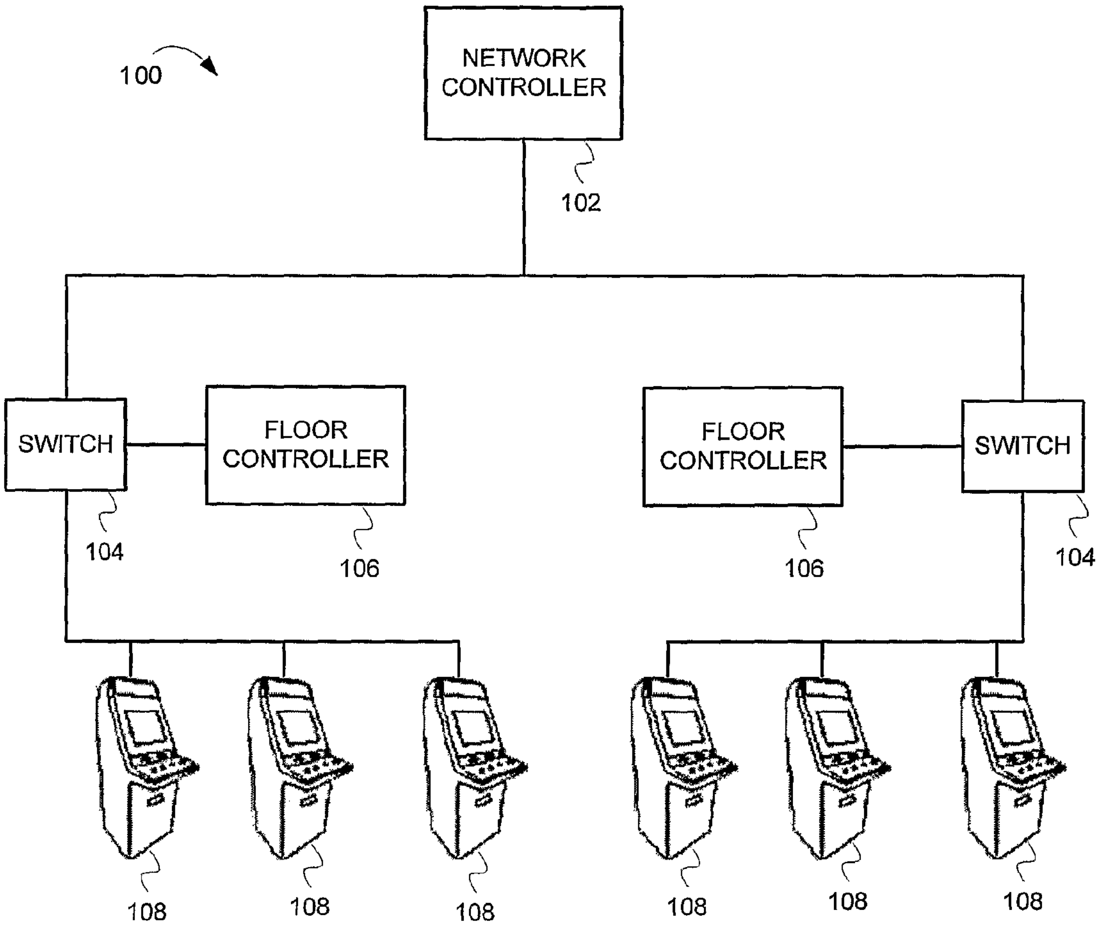
FIG. 1 is a block diagram illustrating a wired gaming network.

Systems, methods, and machine-readable media including instructions for publishing gaming content are described herein. In one embodiment, a gaming device includes a network interface unit to wirelessly receive gaming data from ones of a plurality of components of a wireless mesh network, the network interface unit to wirelessly transmit the gaming data to others of the plurality of components of the wireless mesh network; a memory unit to store certain of the gaming data and to store instructions for conducting wagering games; and a central processing unit to perform operations based in part on the certain of the gaming data and to perform operations based on the instructions. In one embodiment, the gaming device is to maintain routing information for transmitting the gaming data to the others of the plurality of components of the wireless mesh network. In one embodiment, the ones of the plurality of components include other gaming devices and the gaming data includes information about a community wagering game in which the gaming device and the other gaming devices participate. In one embodiment, the network interface unit is to perform the wireless transmission of the gaming data using a low-power radio frequency signal. In one embodiment, the others of the plurality of components of the wireless mesh network are located relatively near the gaming device. In one embodiment, the gaming data includes game themes, game settings, bonus events, pay tables, program code, audio content, or video content. In one embodiment, the new gaming content includes executable game code, game math, game art, game configuration data, game operating system features, game peripheral device drivers, attract mode displays, advertisements, or episodic game content.

In one embodiment, a machine-readable medium includes instructions which when executed by a gaming device cause the gaming device to perform operations comprising wirelessly receiving a gaming data packet from a gaming device on a wireless mesh network; determining whether the gaming data packet should be forwarded to another gaming device on the mesh network; and if the gaming packet should be forwarded, wirelessly transmitting the gaming data packet directly to the other gaming device. In one embodiment, the gaming packet includes a time to live value, and wherein if the time to live value equals zero, the gaming data packet should not be forwarded to another gaming device. In one embodiment, the gaming packet includes a time to live value, the operations further comprising before wirelessly transmitting the gamine data packet directly to the other gaming device, decrementing the time to live value. In one embodiment, the transmitting includes sending the gaming data packet directly to the other gaming device of the mesh network using a low-power wireless signal. In one embodiment, the component of the wireless mesh network is a gaming device.

In one embodiment, a computer-implemented method includes inviting a set of gaming devices to participate in a community wagering game; determining routing information for each gaming device of the set; transmitting the routing information to an arbiter, wherein the arbiter designates one of the set to act as a community wagering game server; receiving an indication indicating which of the set will act as the community game server, wherein the community wagering game server can determine an outcome of the community wagering game; and transmitting gaming information to the community wagering game server. In one embodiment, the routing information for each gaming device indicates how efficiently the gaming device communicates with other gaming devices of the set. In one embodiment, gaming devices of the set are connected to a mesh network. In one embodiment, the gaming information includes player input for the community wagering game. In one embodiment, the routing information for each gaming device indicates a number of hops between the gaming device and others gaming devices of the set. In one embodiment, the routing information for each gaming device indicates a transmission time of data sent from the gaming device to other gaming devices of the set. In one embodiment, the transmitting the routing information to the arbiter includes using wireless low-power radiofrequency signals to propagate the routing information through a mesh network to the arbiter. In one embodiment, the gaming devices are portable.

In one embodiment, a computer-implemented method includes receiving, in a mesh node, gaming data destined for a gaming device on a mesh network; determining whether the gaming data has reach its destination; and if the gaming data has reached its destination, transmitting a response destined for a sender of the gaming data, wherein the response indicates a route traveled by the gaming data. In one embodiment, the method further includes determining, based on a characteristic of the gaming data, that the response should be transmitted. In one embodiment, the method further includes modifying the message to include identification information associated with the mesh node and forwarding the message. In one embodiment, the method further includes determining that the gaming data is not a duplicate of previously received gaming data. In one embodiment, the method is performed by a machine as a result of the machine executing instructions included in a machine-readable medium.

In one embodiment, a computer-implemented method includes transmitting inquiries destined for gaming devices in a mesh network; receiving responses originating from the gaming devices, wherein the responses include traversal information for the mesh network; creating, based on the responses, routing information indicating topology and network characteristics; and maintaining the routing information. In one embodiment, the method further includes transmitting some or all of the routing information to ones of the gaming devices. In one embodiment, the some or all of the routing information is selected from the group consisting of only routes for a gaming device to which the some or all of the routing information is transmitted and only next hops for a gaming device to which the some or all of the routing information is transmitted. In one embodiment, the method further includes advertising mesh routing server services and receiving requests for mesh networking information. In one embodiment, the mesh network includes more than one mesh routing servers. In one embodiment, the transmitting of the inquiries includes transmitting using methods selected from the group consisting of multicasting, unicasting and broadcasting. In one embodiment, the traversal information includes information selected from the group consisting of hop count, latency, and time-to-live. In one embodiment, the maintaining includes transmitting messages to determine whether topology and network characteristics are still valid. In one embodiment, the maintaining includes recalculating paths as the mesh network changes. In one embodiment, the method is performed by a machine as a result of the machine executing instructions included in a machine-readable medium.

In one embodiment, a computer-implemented method includes receiving, from a requestor, a request for a route to a specific gaming device in a mesh network; determining that the route is not known; transmitting a broadcast indicating the specific gaming device; receiving one or more responses, wherein each of the responses indicates a route to the specific gaming device; if more than one response is received, determining a preferred route to the specific gaming device; and transmitting, to the requester, the route to the specific gaming device. In one embodiment, the route to the specific gaming device is selected from the group consisting of a next hop and an entire route. In one embodiment, the route to the specific device is a route originating at the requester. In one embodiment, the determining that the route is not known is performed by searching a routing table. In one embodiment, the determining the preferred route to the specific gaming device includes comparing characteristics of the responses. In one embodiment, the method is performed by a machine as a result of the machine executing instructions included in a machine-readable medium.

DESCRIPTION OF THE EMBODIMENTS

Systems and methods for wireless mesh networking in a gaming environment are described herein. This description of the embodiments is divided into five sections. The first section describes example gaming networks and gaming devices, while the second section describes example operations for transmitting gaming data in a mesh network. The third section describes conducting community based games and the fourth section describes routing operations. The fifth section provides some general comments.

Example Gaming Network and Gaming Devices

This section provides an example mesh network in which embodiments of the invention can be practiced. This section also describes example gaming devices. Operations of mesh network components will be described in the next section.

Example Mesh Network

Figure 2:
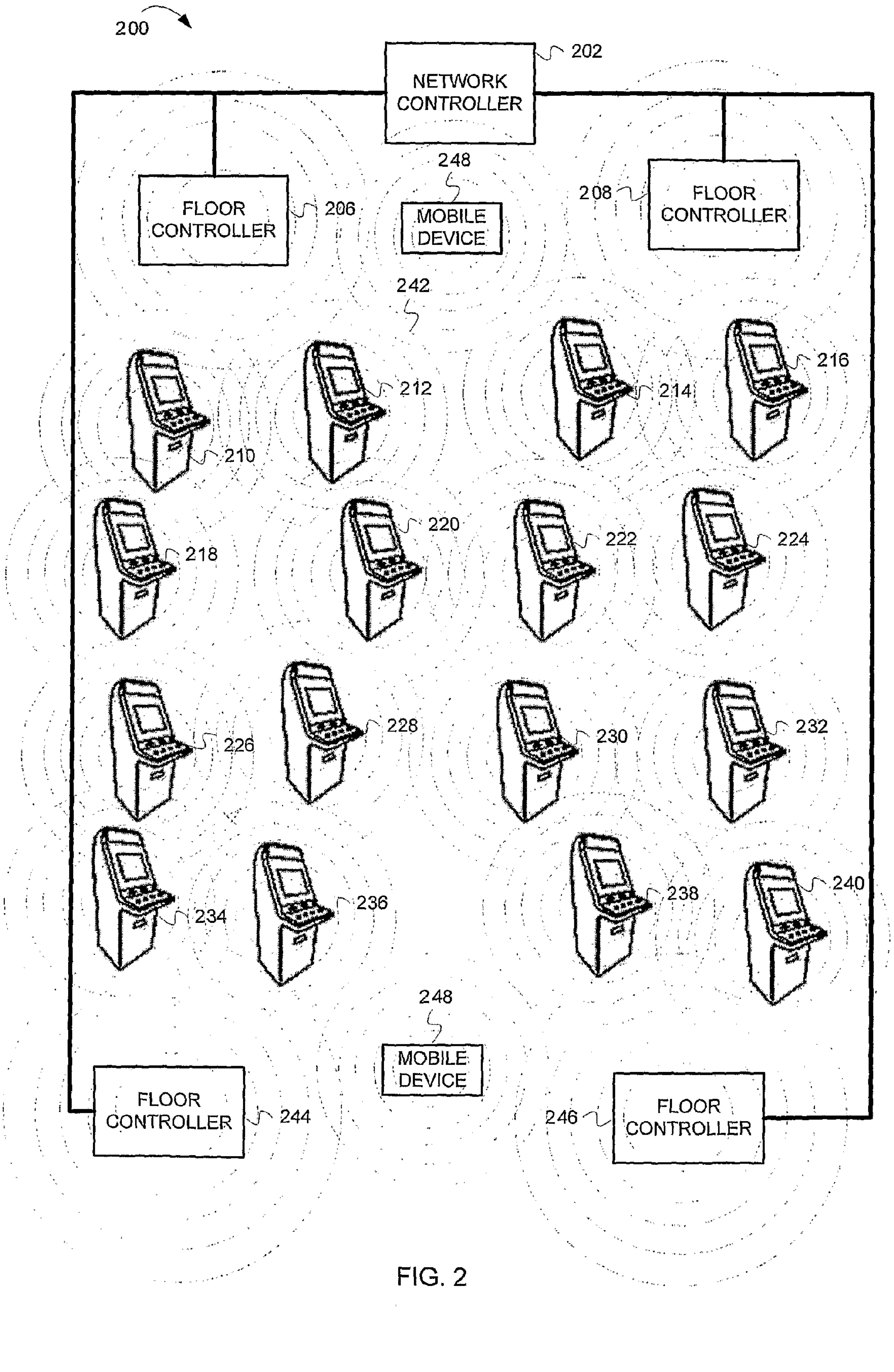
FIG. 2 is a block diagram illustrating a mesh network, according to embodiments of the invention.

FIG. 2 is a block diagram illustrating a mesh network, according to embodiments of the invention. As shown in FIG. 2, the mesh network 200 includes a network controller 202 wired to a plurality of floor controllers 206, 208, 244, and 246. The mesh network 200 also includes a plurality of gaming machines and mobile devices wirelessly coupled to the floor controllers.

The network controller 202 can be connected to and exchange data with other networks, such as wide area networks and/or the Internet. The network controller 202 can route data packets to the floor controllers, which can in turn wirelessly transmit the data packets to nearby gaming devices and/or mobile devices. For example, the network controller 202 can route a data packet to the gaming machine 230 by first transmitting the data packet to the floor controller 246. The floor controller 246 can wirelessly transmit copies of the data packet to gaming machines 238 and 240. Gaming machines 238 and 240 can wirelessly transmit copies of the data packet to nearby gaming devices. That is, gaming machine 240 can transmit copies of the data packet to gaming machines 232 and 238, while gaming machine 238 can transmit copies of the data packet to gaming machines 240, 232, and 230. As a result, the data packet wirelessly hops from the floor controller 246 to the gaming machine 238 and on to its destination at gaming machine 230.

As data packets propagate through the mesh network 200, many copies of the data packets are created and passed between network components. This can lead to significant network traffic. In order to reduce network traffic, some embodiments assign a "time to live" (TTL) value to each packet. Each time the packet, or a copy of the packet, moves to another mesh network component, the packet's TTL value is decremented. The mesh network components may drop packets that have a TTL of zero.

As shown in FIG. 2, each wireless device (e.g., gaming machines, floor controllers, servers, mobile devices, mesh routers) of the mesh network 200 can wirelessly transmit data to other devices. The wireless devices can use different radio technologies including directional and smart antennas, MIMO systems, multi-radio systems, multi-channel systems, reconfigurable radios, frequency agile/cognitive radios, and software radios. In one embodiment, the wireless devices use low-power radiofrequency signals 242 for transmitting data to other wireless devices. In one embodiment, the low-power transmissions can only reach devices within a set range (e.g., neighboring devices). In one embodiment, certain devices use one frequency, while other devices use another frequency. In another embodiment, the wireless devices can use optical signals, such as infrared signals, for transmitting data to other wireless devices. In one embodiment, non-mesh-enabled gaming devices can be converted to mesh-enabled gaming devices by loading software on the non-mesh-enabled devices. The mesh-enabling software can enable gaming devices to operate as mesh clients and/or a mesh routers. In another embodiment, non-mesh-enabled gaming devices can be converted to mesh-enabled gaming devices by integrating a separate mesh-enabled device with the non-mesh-enabled gaming device. As a result, mesh network components can wirelessly relay data to a final destination. In one embodiment, as more wireless devices are added to the mesh network 200, the network's bandwidth increases.

The wireless nature of the mesh network 200 eliminates the need for running wire throughout a casino. Because the gaming devices are not wired into the mesh network 200, casino operators can easily rearrange gaming devices on the casino floor. Moreover, in contrast to traditional wired networks, the mesh network 200 can route gaming data to mobile devices 248, as they move about a casino.

In one embodiment, the mesh network 200 can conduct community wagering games. Community games are described in greater detail below, in the discussion of FIG. 3.

Figure 3:
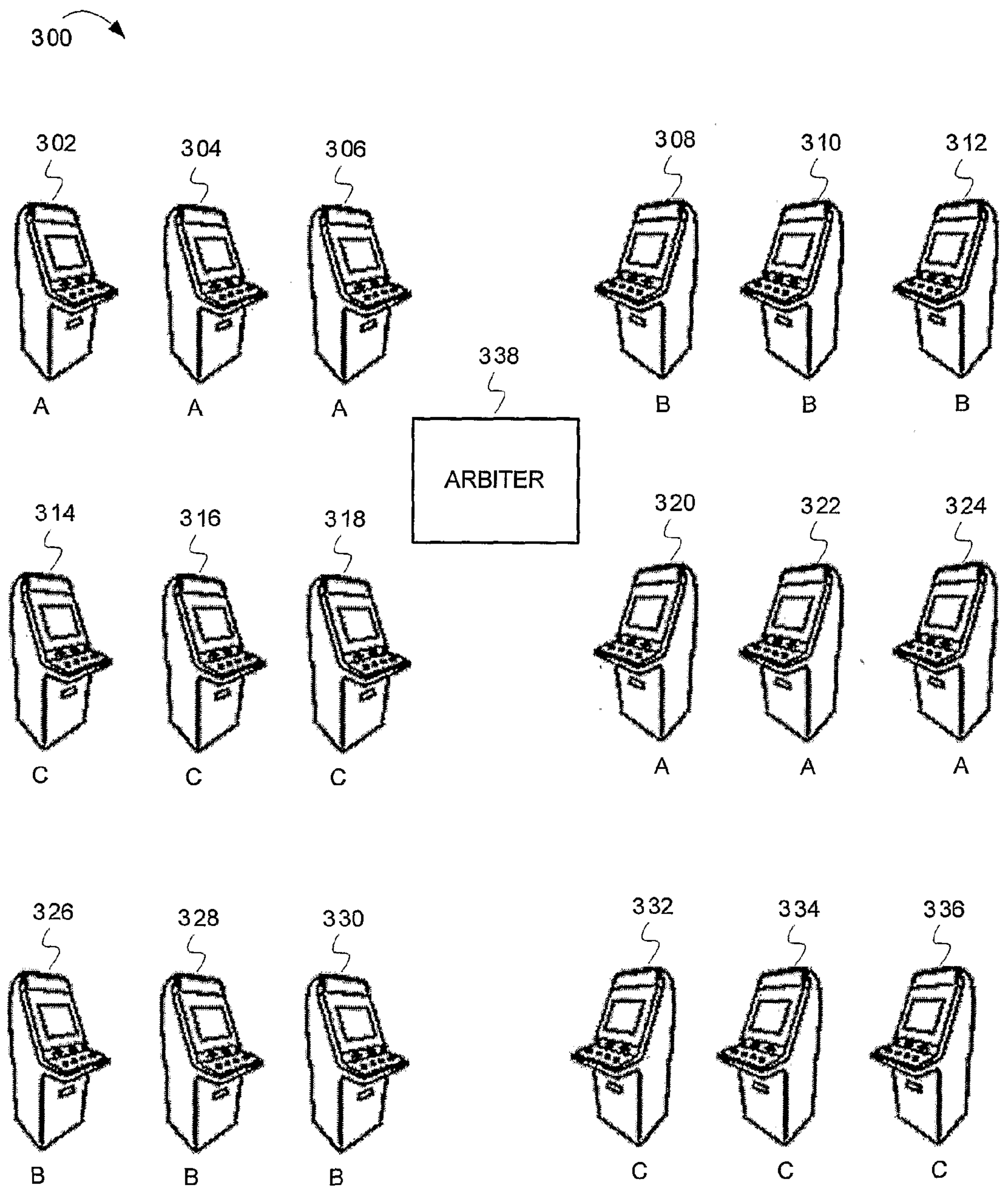
FIG. 3 is a block diagram illustrating gaming devices configured for use in community wagering games conducted in a mesh network, according to example embodiments of the invention.

FIG. 3 is a block diagram illustrating gaming devices configured for use in community wagering games conducted in a mesh network, according to example embodiments of the invention. Each of the gaming devices of FIG. 3 are part of a mesh network 300, although all the network components are not shown. In one embodiment, different gaming devices can participate in different community wagering games. For example, gaming machines 302, 304, and 306 can participate in community wagering game "A" along with gaming machines 320, 322, and 324. Similarly, gaming machines 308, 310, and 312 can participate in community wagering game "B" along with gaming machines 326, 328, and 330. Additionally, gaming machines 314, 316, and 318, can participate in community wagering game "C" along with gaming machines 332, 334, and 336. In one embodiment, mobile devices (not shown in FIG. 3) can participate in the different community games, depending on their proximity to the various gaming devices.

In one embodiment, a community wagering game allows multiple gaming devices to participate in a single game. For example, gaming device 306 can invite other gaming devices associated with wagering game "A" to join a community bonus game. In a community bonus game, each participating gaming device can take one or more turns in a theme-specific bonus game (e.g., a bonus game based on Monopoly®, available from Hasbro, Inc.). For example, players on each participating gaming device can roll virtual dice and move virtual game tokens around a virtual game board. During the community bonus game, the players can win money and game pieces, which can be used in future community games.

In one embodiment, before a gaming device can invite others to participate in a community game, the arbiter 338 selects one of the participating gaming devices to act as a community game server. The arbiter 338 can be a stand-alone wireless gaming device or it can be integrated into other components of the mesh network 300. In one embodiment, the community game server determines outcomes and presents results of community games. In one embodiment, gaming devices that are not acting as the community game server may provide player input to the community game server.

Operations of these and other embodiments are described in greater detail below, in the next section. This description continues with a discussion of example gaming machines.

Example Gaming Machine Architecture

Figure 4:
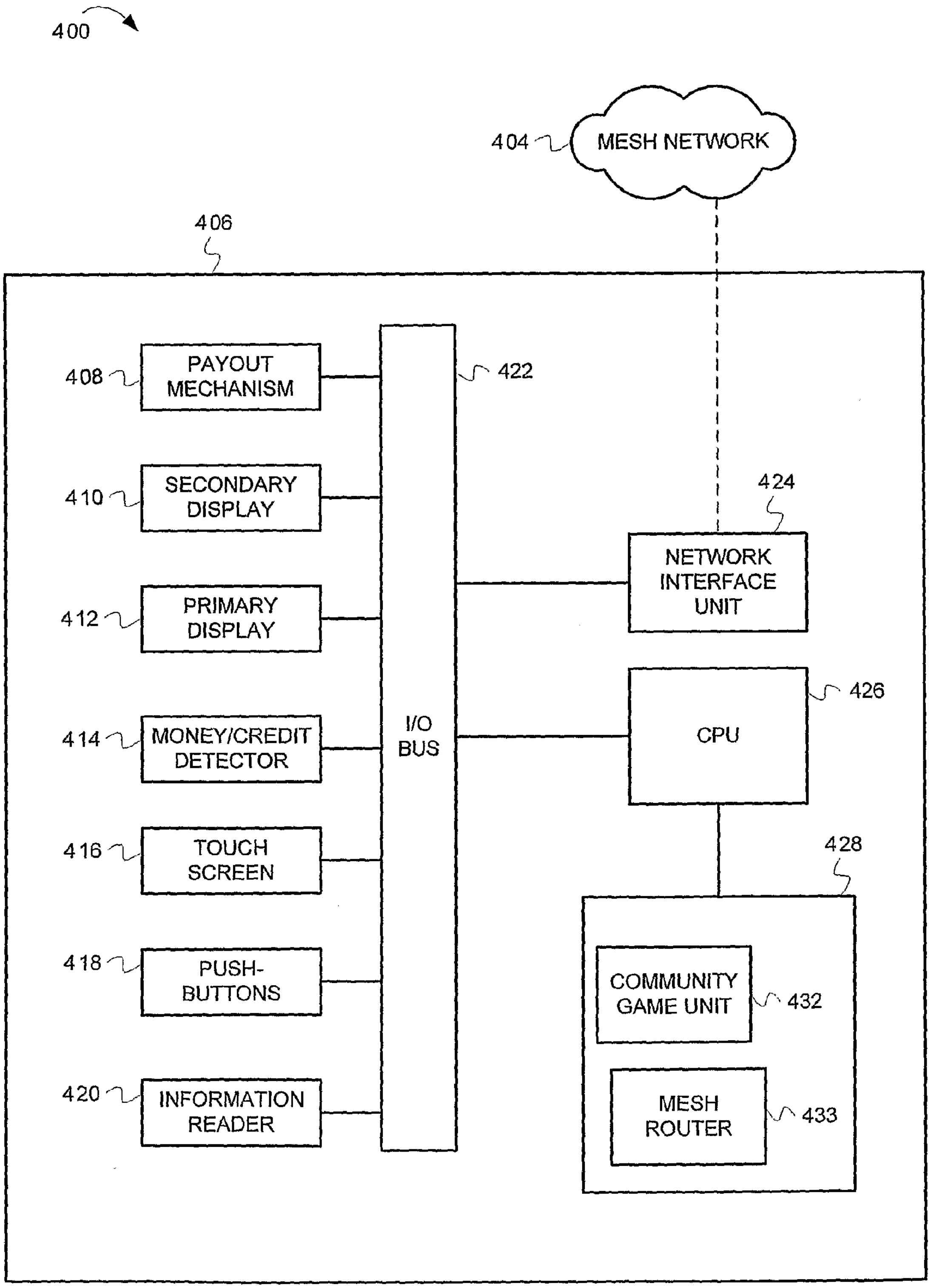
FIG. 4 is a block diagram illustrating components of a gaming device, used in conjunction with example embodiments of the invention.

FIG. 4 is a block diagram illustrating components of a gaming machine, used in conjunction with example embodiments of the invention. As shown in FIG. 4, the gaming machine 406 includes a central processing unit (CPU) 426 connected to a memory unit 428, which includes a community game unit 432 and mesh router 433. Operations of the mesh router 433 will be described below, in the routing operations section.

The CPU 426 is also connected to a network interface unit 424, which is connected to a mesh network 404. The CPU 426 is also connected to an input/output (I/O) bus 422. The I/O bus 422 is connected to a payout mechanism 408, secondary display 410, primary display 412, money/credit detector 414, touchscreen 416, push-buttons 418, and information reader 420. The I/O bus 422 facilitates communication between the system components and the CPU 426.

According to some embodiments, the gaming machine 406 can include additional peripheral devices and/or more than one of each component shown in FIG. 4. For example, in one embodiment, the gaming machine 406 can include multiple network interface units 424 and multiple CPUs 426. Additionally, the components of the gaming machine 406 can be interconnected according to any suitable interconnection architecture (e.g., directly connected, hypercube, etc.).

According to some embodiments, the gaming machine 406 includes tangible machine-readable media including instructions for conducting a basic wagering game, conducting a bonus game, and publishing gaming content in a network. Machine-readable media includes any mechanism that provides (i.e., stores and/or transmits) information in a form readable by a machine (e.g., a computer). For example, a tangible machine-readable medium includes read only memory (ROM), random access memory (RAM), magnetic disk storage media, optical storage media, flash memory devices, etc. According to embodiments of the invention, the gaming machine 406 and other components of the mesh network can include other types of logic (e.g., digital logic) for executing the operations described herein.

According to embodiments, the gaming machine 406 can conduct any suitable casino-style wagering game, such as video poker, video blackjack, video slots, etc. Additional details about gaming machines used in conjunction with embodiments of the invention are described below, in the discussion of FIG. 5.

Figure 5:
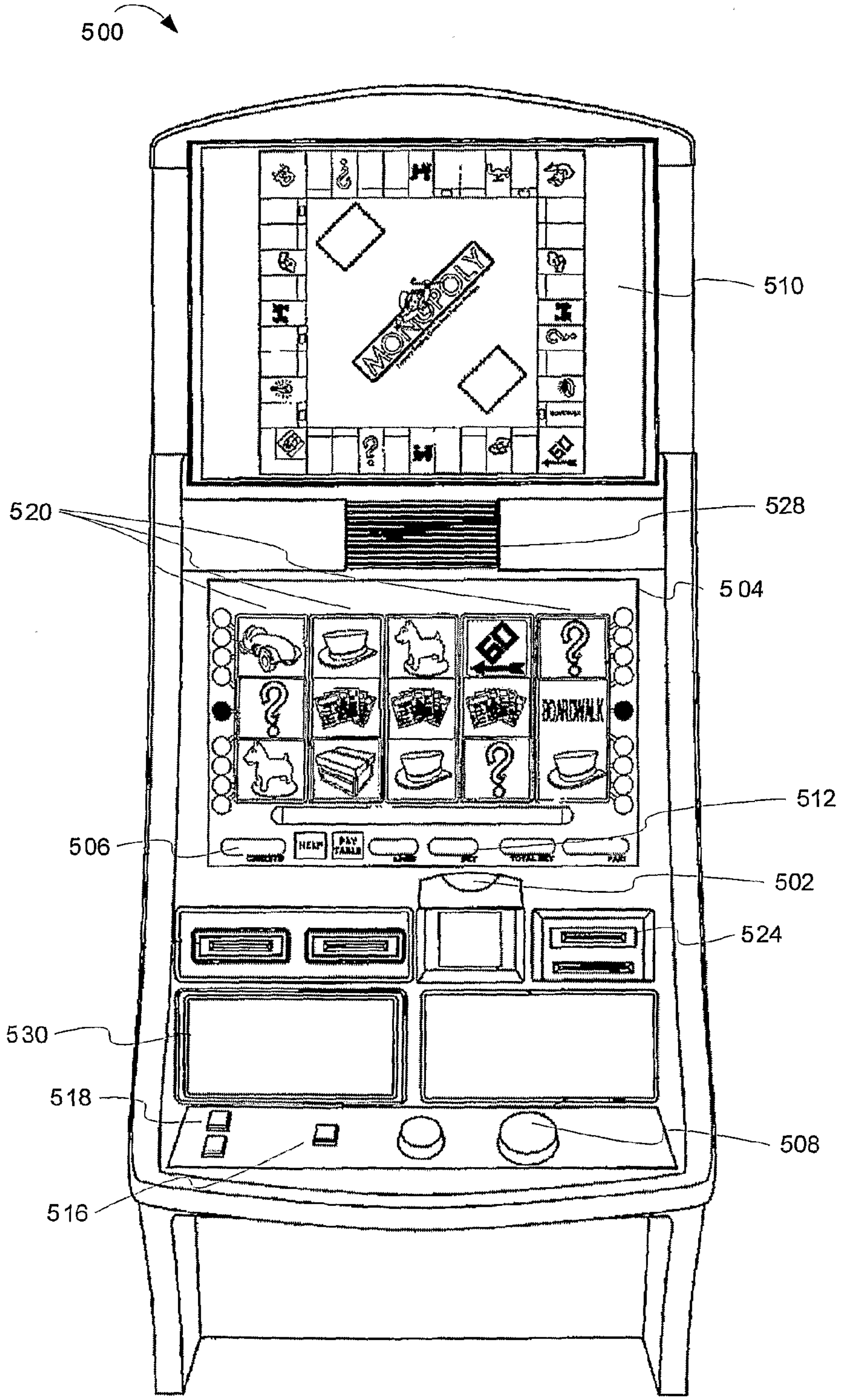
FIG. 5 is a perspective view of a gaming device, according to example embodiments of the invention.

FIG. 5 is a perspective view of a gaming machine, according to example embodiments of the invention. As shown in FIG. 5, the gaming machine 500 can be a computerized slot machine having the controls, displays, and features of a conventional slot machine.

The gaming machine 500 can be operated while players are standing or seated. Additionally, the gaming machine 500 is preferably mounted on a stand (not shown). However, it should be appreciated that the gaming machine 500 can be constructed as a pub-style tabletop game (not shown), which a player can operate while sitting. Furthermore, the gaming machine 500 can be constructed with varying cabinet and display designs. The gaming machine 500 can incorporate any primary game such as slots, poker, or keno, and additional bonus round games. The symbols and indicia used on and in the gaming machine 500 can take mechanical, electrical, or video form.

As illustrated in FIG. 5, the gaming machine 500 includes a coin slot 502 and bill acceptor 524. Players can place coins in the coin slot 502 and paper money or ticket vouchers in the bill acceptor 524. Other devices can be used for accepting payment. For example, credit/debit card readers/validators can be used for accepting payment. Additionally, the gaming machine 500 can perform electronic funds transfers and financial transfers to procure monies from financial accounts. When a player inserts money in the gaming machine 500, a number of credits corresponding to the amount deposited are shown in a credit display 506. After depositing the appropriate amount of money, a player can begin playing the game by pushing play button 508. The play button 508 can be any play activator used for starting a wagering game or sequence of events in the gaming machine 500.

As shown in FIG. 5, the gaming machine 500 also includes a bet display 512 and a "bet one" button 516. The player places a bet by pushing the bet one button 516. The player can increase the bet by one credit each time the player pushes the bet one button 516. When the player pushes the bet one button 516, the number of credits shown in the credit display 506 decreases by one credit, while the number of credits shown in the bet display 512 increases by one credit.

A player may "cash out" by pressing a cash out button 518. When a player cashes out, the gaming machine 500 dispenses a voucher or currency corresponding to the number of remaining credits. The gaming machine 500 may employ other payout mechanisms such as credit slips (which are redeemable by a cashier) or electronically recordable cards (which track player credits), or electronic funds transfer.

The gaming machine also includes a primary display unit 504 and a secondary display unit 510 (also known as a "top box"). The gaming machine may also include an auxiliary video display 530. In one embodiment, the primary display unit 504 displays a plurality of video reels 520. According to embodiments of the invention, the display units 504 and 510 can include any visual representation or exhibition, including moving physical objects (e.g., mechanical reels and wheels), dynamic lighting, and video images. In one embodiment, each reel 520 includes a plurality of symbols such as bells, hearts, fruits, numbers, letters, bars or other images, which correspond to a theme associated with the gaming machine 500. Furthermore, as shown in FIG. 5, the gaming machine 500 includes an audio presentation unit 528. The audio presentation unit 528 can include audio speakers or other suitable sound projection devices.

In one embodiment, a plurality of gaming machines 500 can be wirelessly connected in a mesh network. In the mesh network, the gaming machines 500 can conduct community games and relay data through the mesh network, as described herein.

The next sections describe operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., digital logic).

Transmitting Data in a Mesh Network

In the discussion below, FIGS. 6 and 7 describes operations for transmitting gaming data in a mesh network. The discussion continues with FIG. 6.

Figure 6:
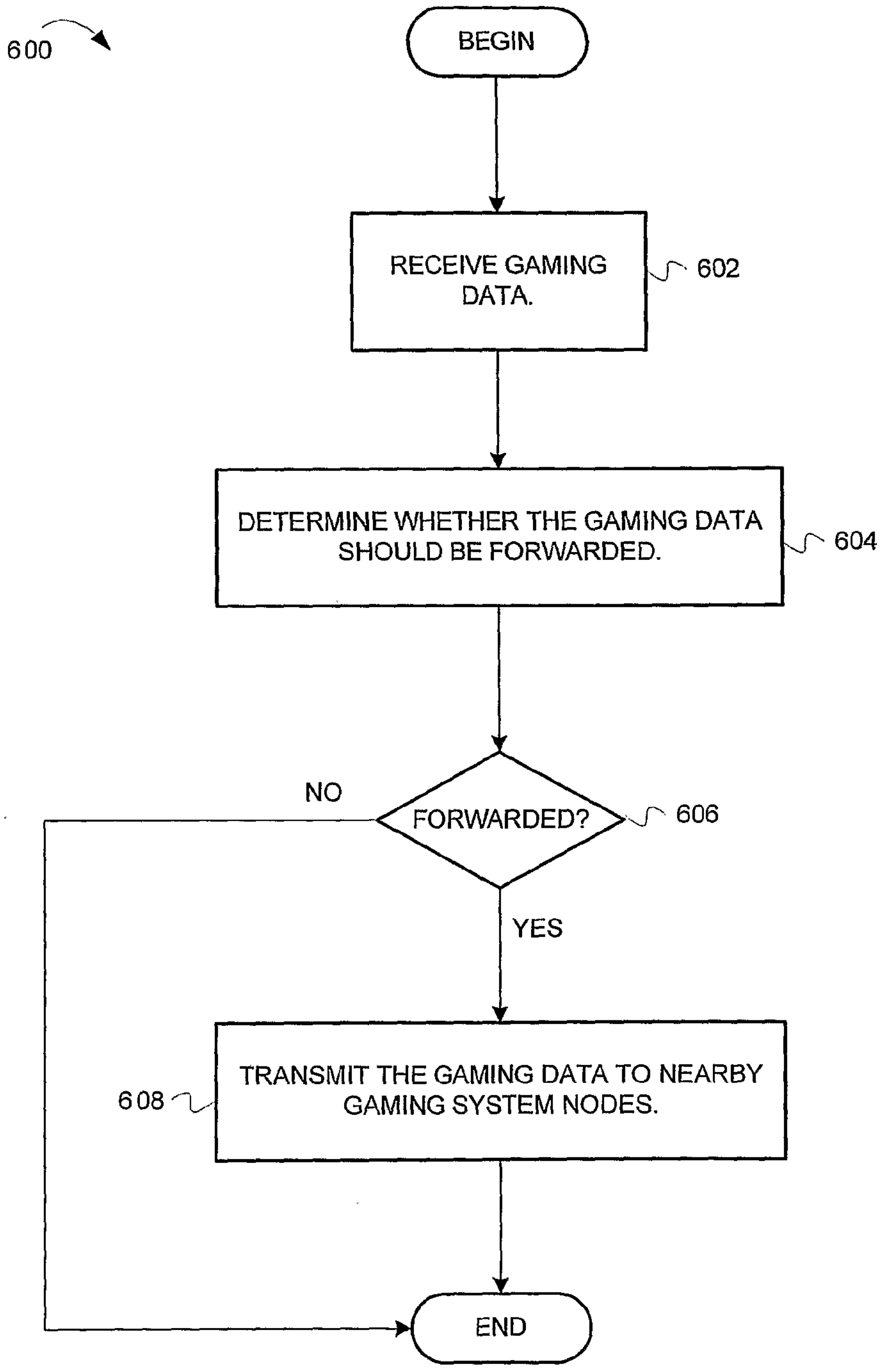
FIG. 6 is a flow diagram illustrating operations for transmitting gaming data in a mesh network, according to example embodiments of the invention.

FIG. 6 is a flow diagram illustrating operations for transmitting gaming data in a mesh network, according to example embodiments of the invention. The flow 600 commences at block 602.

At block 602, gaming data is received. For example, the gaming machine 238 receives a gaming data packet from the floor controller 246 or other mesh network component. The flow continues at block 604.

At block 604, a determination is made about whether the gaming data should be forwarded. For example, the gaming machine 238 determines whether the gaming data packet has reached its final destination, whether the gaming data packet should be forwarded to neighboring gaming devices, or whether the gaming data packet should be dropped (e.g., because the packet's TTL equals zero). In one embodiment, the gaming devices do not maintain routing information, so the gaming devices broadcast every packet to all mesh network components within range. In another embodiment, the gaming devices maintain routing information, so they forward packets to certain components within range. The flow continues at block 606.

At block 606, if the packet should be forwarded, the flow continues at block 608. Otherwise, the flow ends.

At block 608, the gaming data is transmitted to nearby mesh network components. For example, the gaming machine 238 transmits the gaming data packet to gaming machines 230, 232, and 240. In an embodiment in which the gaming machine 238 includes routing information, the gaming machine 238 transmits the data packet exclusively to gaming machine 230. From block 608, the flow ends.

Figure 7:
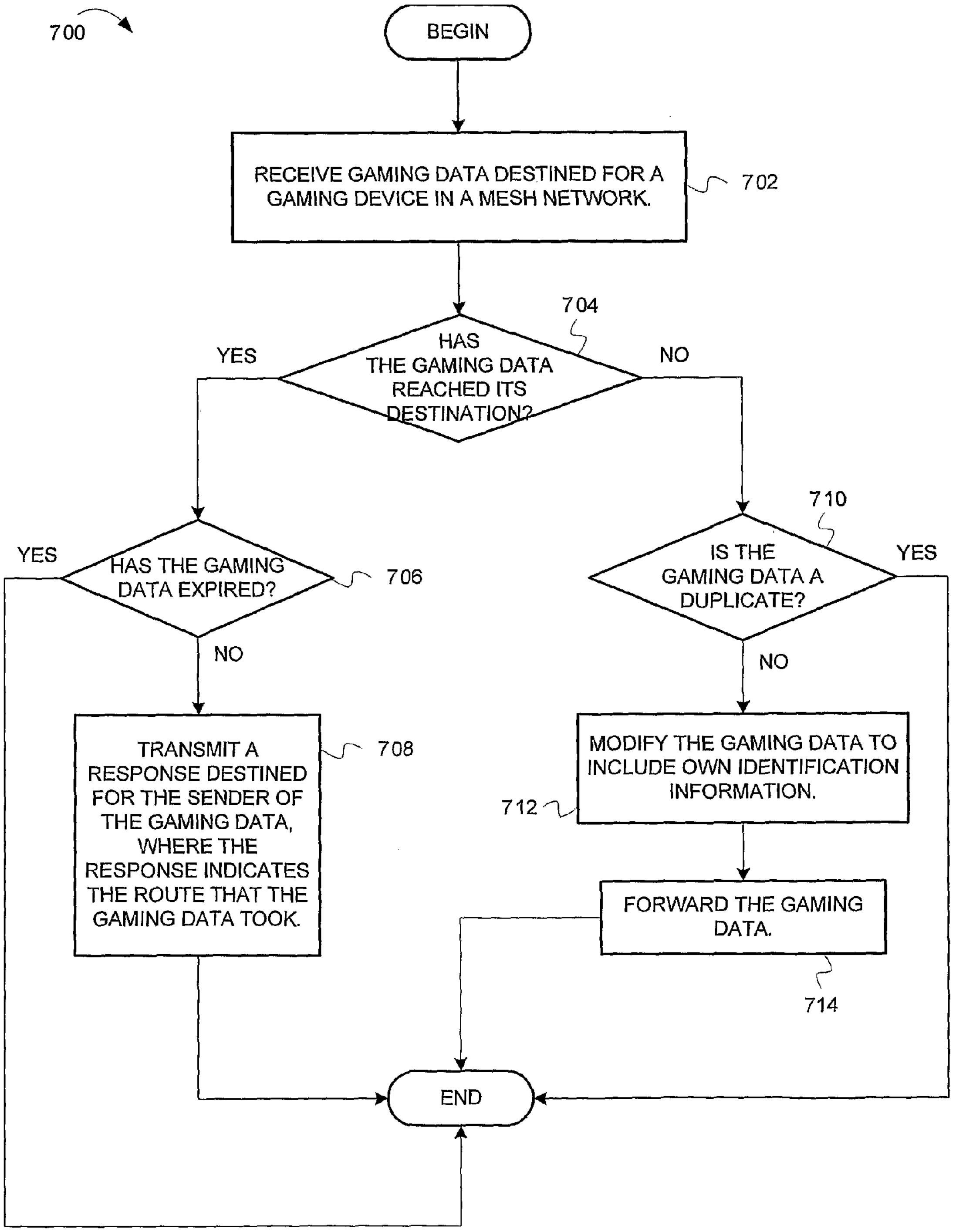
FIG. 7 is a flow diagram illustrating operations for adding routing information to packets moving through a mesh network, according to example embodiments of the invention.

While FIG. 6 describes operations for transmitting gaming data in a mesh network, FIG. 7 describes adding routing information to data transmitted through mesh network.

FIG. 7 is a flow diagram illustrating operations for adding routing information to packets moving through a mesh network, according to example embodiments of the invention. The flow diagram 700 commences at block 702.

At block 702, gaming data destined for a mesh network gaming device is received. For example, the gaming machine 238 receives a gaming data packet destined for another gaming device in the mesh network 200. The flow continues at block 704.

At block 704, a determination is made about whether the gaming data has reached its destination. For example, the gaming machine 238 determines whether the gaming data packet has reached its destination. If the gaming data packet has reached its destination, the flow continues at block 706. Otherwise, the flow continues at block 710.

At block 706, a determination is made about whether the gaming data has expired. For example, the gaming machine 238 determines whether the gaming data packet has expired. A gaming data packet can expire as a result of some latency or upon satisfaction of some condition. In one embodiment, the gaming data packet expires when its TTL equals zero. If the gaming data has expired, the flow ends. Otherwise, the flow continues at block 708.

At block 708, the gaming machine 238 transmits a response destined for the gaming data packet's sender, where the response includes the packet's route from the source to the destination. In one embodiment, the source updates its routing information with the route included in the response. As a result, the source can sends packets to that destination using the route included in the reply. From block 708, the flow ends.

At block 710, a determination is made about whether the gaming data is a duplicate. For example, the gaming machine 238 determines whether it has already received the gaming data packet. In one embodiment, the gaming machine 238 drops duplicate data packets to reduce mesh network traffic. If the gaming data packet is a duplicate, the flow ends. Otherwise, the flow continues at block 712.

At block 712, gaming device information is inserted into the gaming data. For example, the gaming machine 238 inserts its media access control (MAC) address and/or its internet protocol (IP) address into the gaming data packet. The gaming machine's MAC address or IP address can be used by other mesh network devices to determine routing information and network performance. In one embodiment, the gaming machine also inserts analytic information such as a timestamp into the gaming data packet. The flow continues at block 714.

At block 714, the gaming data is forwarded. For example, the gaming machine 238 forwards the gaming data packet to its neighbors (i.e., gaming machines 230, 232, at 240). From block 714, the flow ends.

While FIGS. 6 and 7 describe how gaming data propagates through a mesh network, FIGS. 8-12 describe operations for conducting community-based wagering games.

Conducting Community-Based Wagering Games

This section describes operations for finding members of a gaming community, selecting a game server from members of a gaming community, and participating in a community game. This section continues with FIG. 8.

Figure 8:
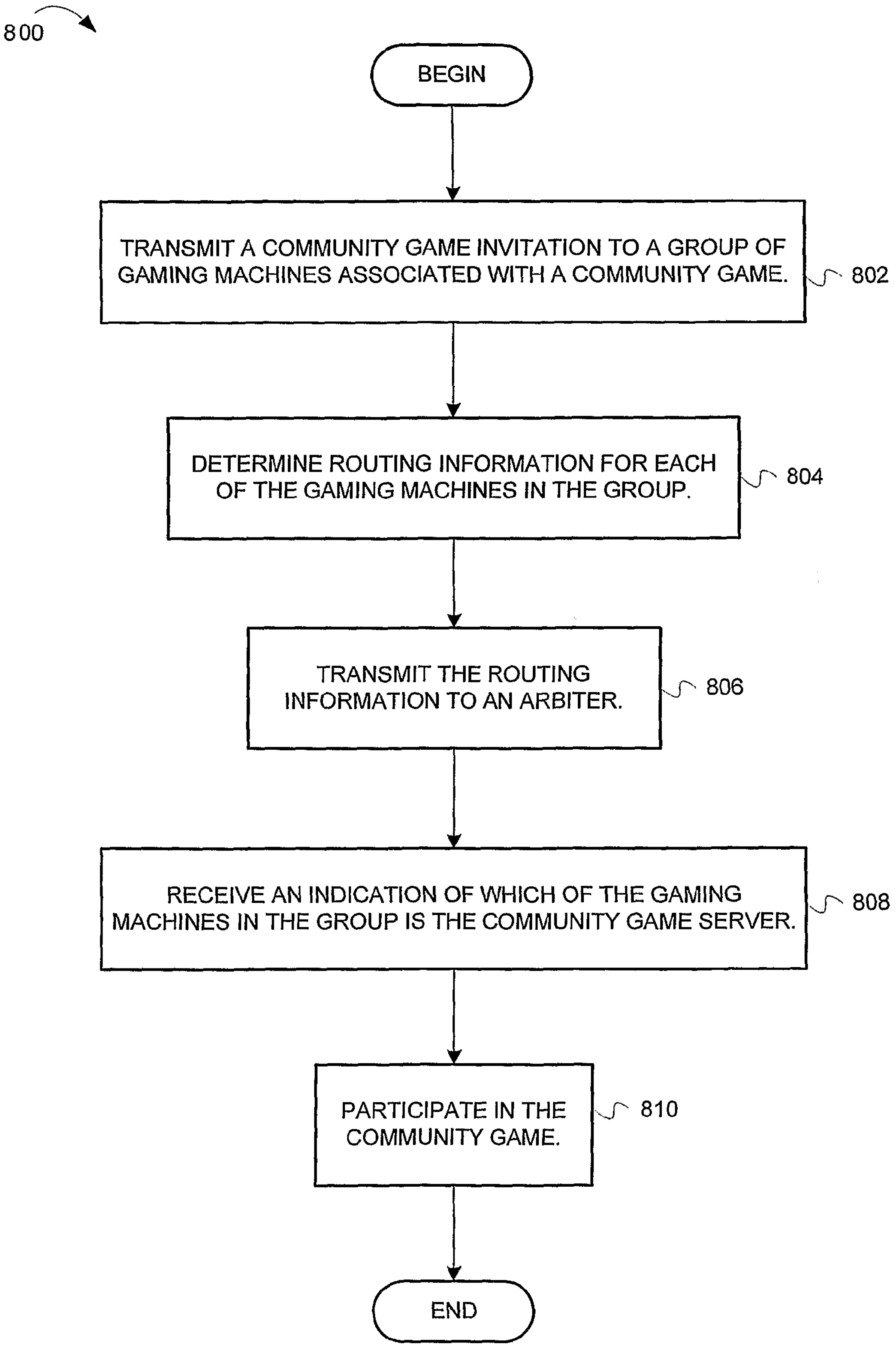
FIG. 8 is a flow diagram illustrating operations for conducting a community game in a mesh network, according to example embodiments of the invention.

FIG. 8 is a flow diagram illustrating operations for conducting a community game in a mesh network, according to example embodiments of the invention. The flow diagram 800 will be described with reference to the mesh network shown in FIG. 3. The flow diagram 800 commences at block 802.

At block 802, a community game invitation is transmitted to a group of gaming devices associated with a community game. For example, the gaming machine 302 transmits a community game invitation to the gaming devices associated with the community game "A" (i.e., gaming machines 304, 306, 320, 322, and 324). In one embodiment, the gaming machine 302 wirelessly transmits the invitation to nearby gaming machines 304, 314, and 316, which in turn wirelessly relay the indication onto the intended recipients. The flow continues at block 804.

Figure 9:
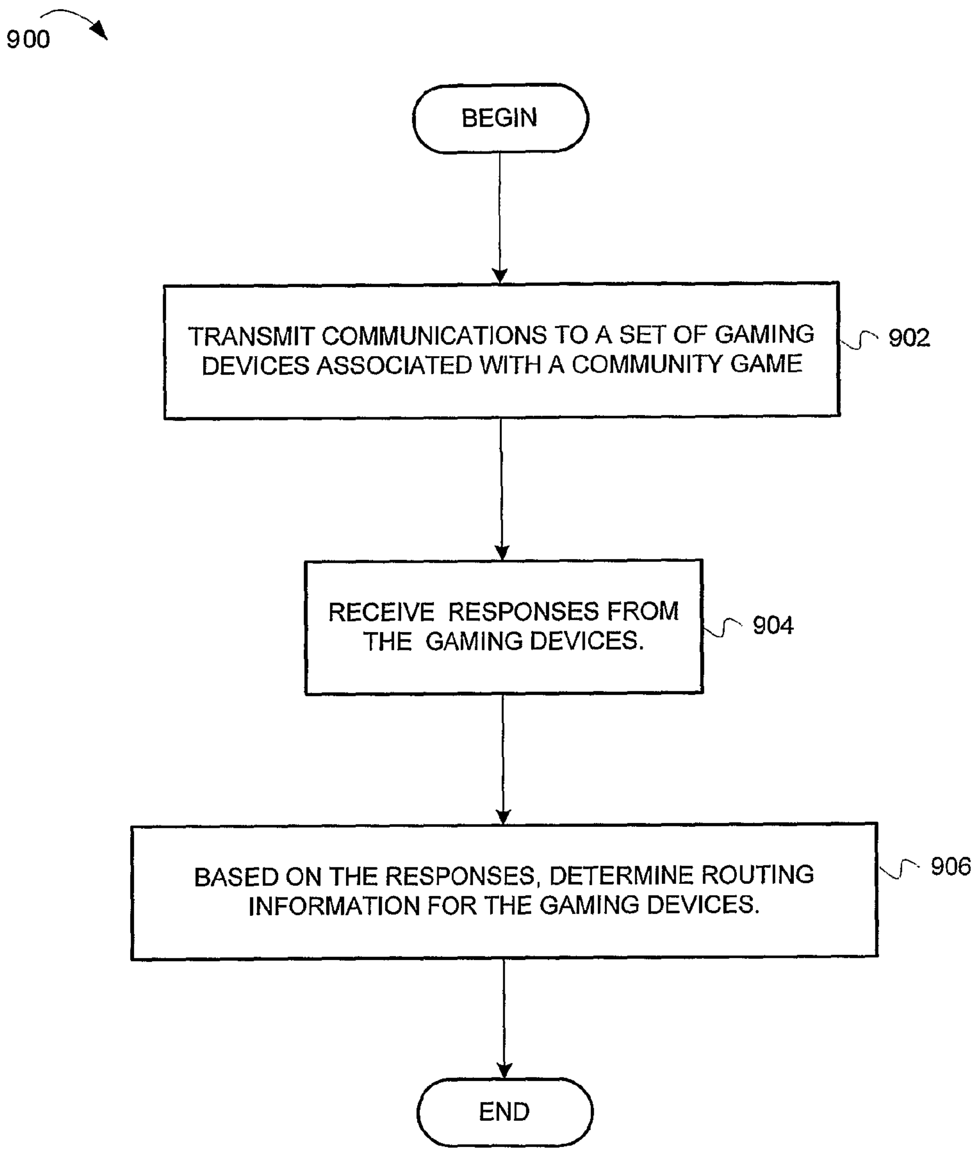
FIG. 9 is a flow diagram illustrating operations for determining routing information for devices associated with a community game, according to example embodiments of the invention.

At block 804, routing information is determined for the gaming devices in the group. For example, the gaming machine 302 determines routing information for the gaming devices in the group. In one embodiment the routing information includes a routing table. In another embodiment, the routing information includes a traversal rating for each gaming device in the group. For example, the gaming machine 302 determines a traversal rating for all the gaming devices associated with the community game "A". In one embodiment, a traversal rating indicates how fast and/or efficiently each gaming device can transmit data to other gaming devices of the group. In one embodiment, the traversal ratings are used for determining which gaming device will act as community game server. FIG. 9 describes more detailed operations for determining routing information. The flow continues at block 806.

At block 806, the routing information is transmitted to an arbiter. For example, the gaming machine 302 transmits the traversal ratings to the arbiter 338, which selects one of the gaming devices to act as a community game server. The arbiter 338 can be a gaming machine, a gaming server, a gaming controller, or any other gaming device. In one embodiment, the community game server determines and presents results for the community game. Operations of the arbiter 338 are described in FIG. 9. The flow continues at block 808.

At block 808, an indication about which of the gaming devices will act as the community game server is received. For example, the gaming machine 302 receives from the arbiter 338 a data packet indicating which of the gaming devices associated with the community game "A" will act as the community game server. In one embodiment, the arbiter wirelessly relays an indication to each of the gaming devices associated with community game "A". The flow continues at block 810.

At block 810, the community game is played. For example, the gaming machine 302 participates in the community game, which is served by the designated community game server. From block 810, the flow ends.

In one embodiment, gaming devices perform the operations of the flow 800 only when initializing a gaming network for playing community games. Thus, after a community game server has been selected, gaming devices can participate in community games without determining routing information (804), transmitting the routing information to an arbiter (806), and receiving an indication of the community server (808). In another embodiment, gaming devices intermittently perform the operations at blocks 804, 806, and 808. As a result, the gaming devices can adapt to changes in the mesh network and thus optimize the network's performance.

This section continues with a more detailed discussion of the operation at block 804. That is, the description continues with a discussion of operations for determining routing information for a group of gaming devices associated with a community game.

FIG. 9 is a flow diagram illustrating operations for determining routing information for devices associated with a community game, according to example embodiments of the invention. The flow 900 commences at block 902.

At block 902, data is transmitted to a set of gaming devices associated with a community game. For example, the gaming machine 302 wirelessly transmits data packets to the set of gaming machines and/or mobile devices associated with a community game (e.g., community game "A"). In one embodiment, the data packets "hop" through the mesh network, arriving at each gaming device. The flow continues at block 904.

At block 904, responses are received from each of the set of gaming devices. For example, the gaming machine 302 receives data packets from each of the set of gaming machines and/or mobile devices associated with the community game. The data packets can propagate through the mesh network, reaching the gaming machine 302. The flow continues at block 906.

At block 906, based on the responses, routing information is determined for the gaming devices in the set. For example, the gaming machine 302 determines routing information based on the responses. The responses can reveal many different characteristics of the mesh network 300. For example, the responses can indicate how long it took for the data packet to travel from its source to the gaming device 302. The response may also indicate the number of hops from the data packet's source to the gaming device 302, latencies between mesh network components, and/or signal strength between gaming devices. Other embodiments can indicate other network characteristics.

In one embodiment, the routing information is based on the number of hops. For example, the gaming device needing the fewest number of hops to reach other gaming devices may get the best traversal rating. In another embodiment, the routing information is based on communication latencies. For example, the gaming device with the shortest latencies is assigned the best traversal rating, while the others are assigned lesser traversal ratings.

In another embodiment, based on the responses, the gaming device 302 determines a routing table indicating paths to every other gaming device/mobile device. Operations for creating a routing table are described in greater detail below, in the next section.

Figure 10:
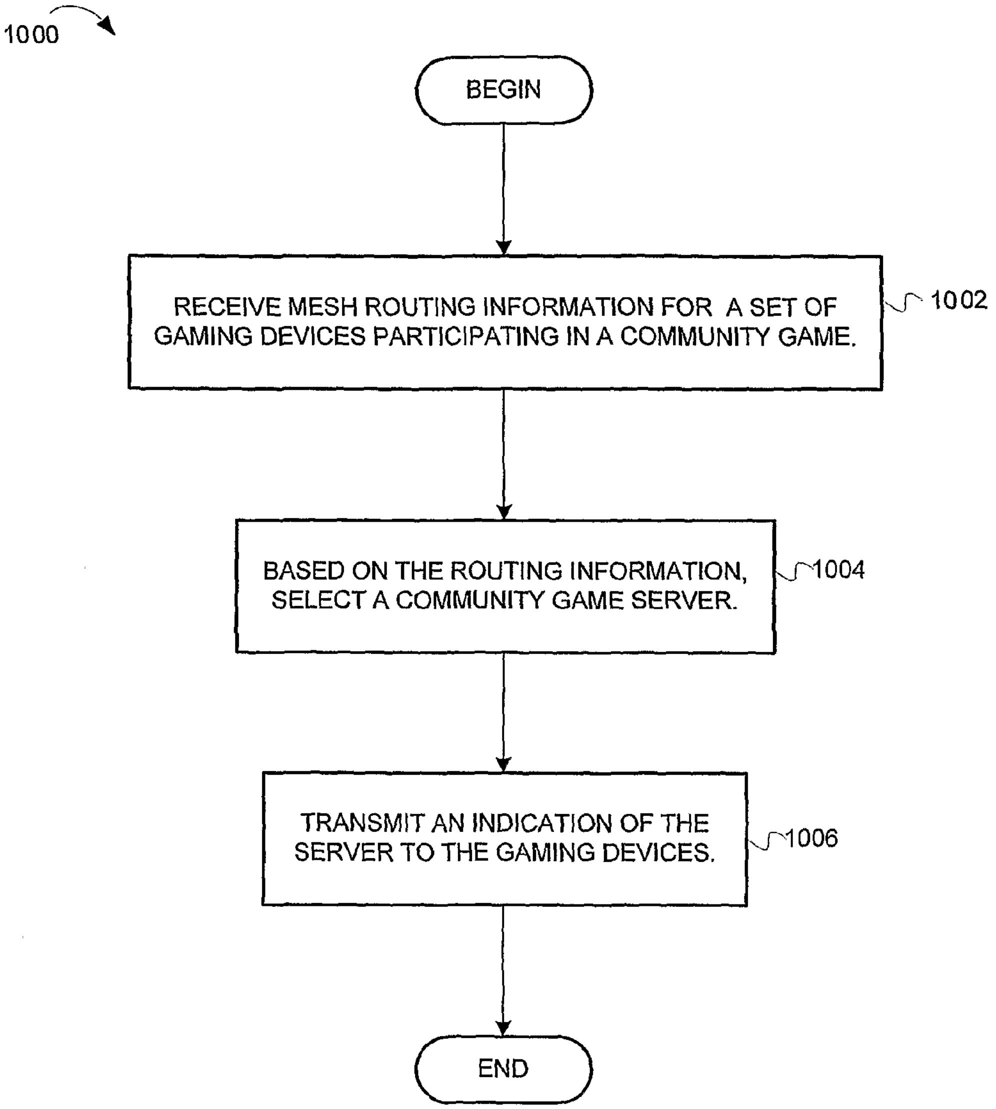
FIG. 10 is a flow diagram illustrating operations for selecting a community game server from a group of gaming devices in a mesh network, according to example embodiments of the invention.

This section continues with a discussion of operations for selecting a community game server. In one embodiment, an arbiter uses routing information to select a community game server (see block 806 and FIG. 10). FIG. 10 is described next.

FIG. 10 is a flow diagram illustrating operations for selecting a community game server from a group of gaming devices in a mesh network, according to example embodiments of the invention. The flow diagram 1000 commences at block 1002.

At block 1002, routing information associated with a set of gaming devices is received. For example, the arbiter 338 receives a plurality of traversal ratings or routing tables from the gaming device 302. The traversal ratings are associated with gaming machines and/or mobile devices that will participate in a community game. The flow continues at block 1004.

At block 1004, based on the routing information, a community game server is selected. For example, based on the traversal ratings or routing tables, the arbiter 338 designates one of the participating gaming devices to act as community game server. In one embodiment, the arbiter 338 designates the gaming device with the highest traversal ratings as the community game server. In one embodiment, the arbiter 338 designates as the community game server the gaming device with the shortest "longest path" or the shortest "longest delay" to all other gaming devices. If more than one gaming device has the most efficient routing table or the best traversal ratings, embodiments can use non-traffic based information to select the community game server. For example, the arbiter 338 can break ties by selecting the gaming device with the lowest MAC address.

In one embodiment, the arbiter 338 can prohibit some of the gaming machines and/or mobile devices from serving as community game server. For example, in one embodiment, the arbiter 338 will not select mobile devices to serve as community game servers because they may quickly migrate out of range, adding overhead for designating a new community server. In another embodiment, the arbiter 338 will not designate untrusted gaming machines and mobile devices to serve as community game server. Gaming machines/mobile device may be untrusted if they were made by an unknown manufacturer, or if they do not respond with proper security credentials, security certificates, etc.

As noted above, the mesh network can be adaptive, periodically designating community game servers. After a community game server has been designated for a particular community game, the arbiter 338 can analyze whether performance gains from designating a different community game server will offset overhead (e.g., network traffic, gaming device resource usage, etc.) associated with moving the server. If performance gains will not likely offset overhead, the arbiter 338 will not designate a new community game server despite new routing information. The flow continues at block 1006.

At block 1006, an indication of which gaming device/mobile device will act as the community game server is transmitted to the gaming devices participating in the community game. For example, the arbiter 338 transmits to the gaming devices an indication of which of the gaming devices will act as the community game server. From block 1006, the flow ends.

Although FIG. 10 describes selecting community game servers based on routing information, some embodiments select community gaming servers using non-traffic-based information. For example, an arbiter or other gaming device can select community gaming servers using a lowest MAC address, a serial number, or a manually assigned parameter. In another embodiment, the community gaming server can be selected using a combination of non-traffic-based information and traffic-based information (e.g., routing information). In yet another embodiment, an administrator can select community game's community game server.

Figure 11:
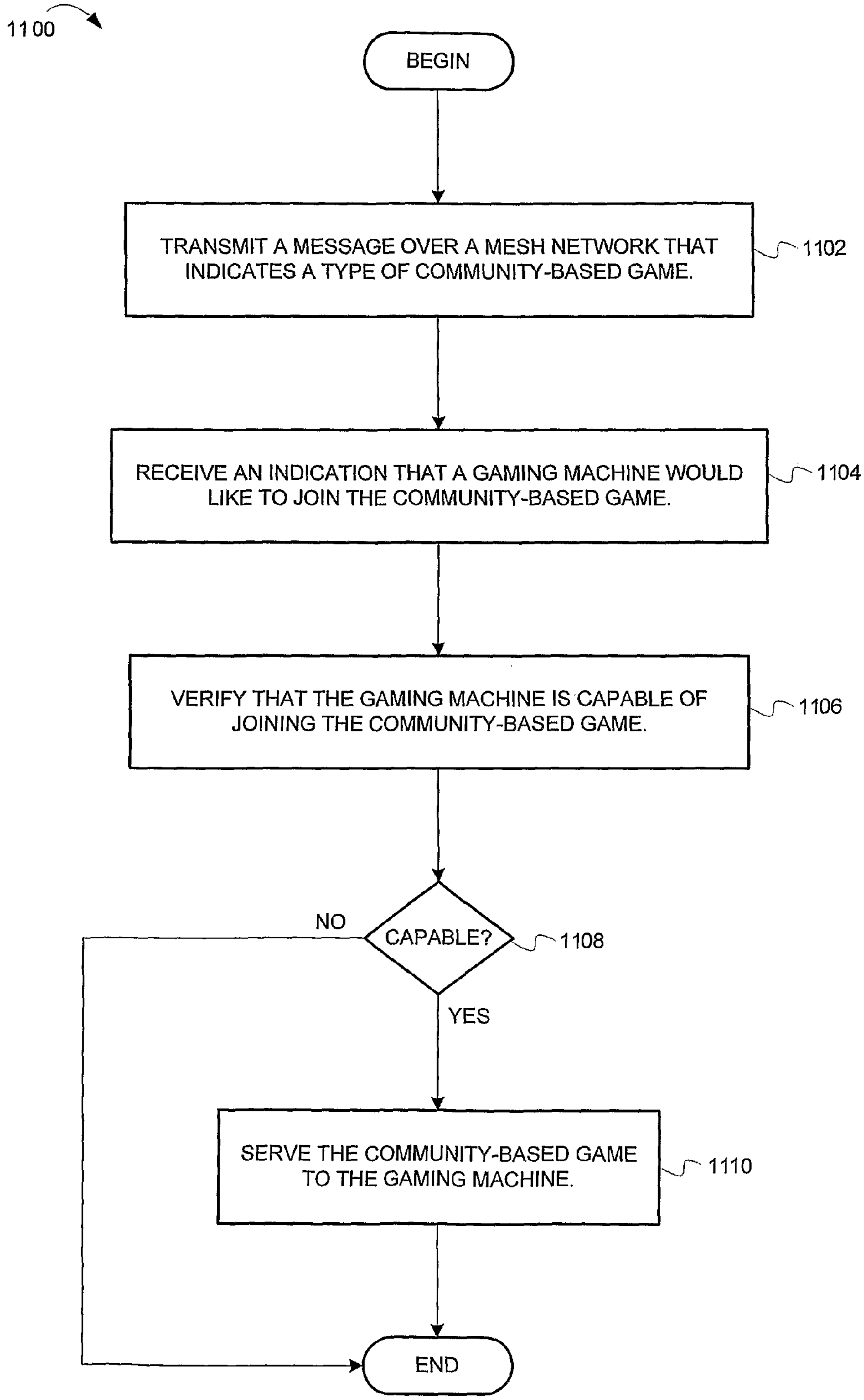
FIG. 11 is a flow diagram illustrating operations for advertising that a game server is available and serving a community game, according to example embodiments of the invention.

After a community game server has been designated, the server can advertise its availability and server community games. FIG. 11 describes this in greater detail.

FIG. 11 is a flow diagram illustrating operations for advertising that a game server is available and serving a community game, according to example embodiments of the invention. The flow diagram 1100 commences at block 1102.

At block 1102, a message is transmitted over a mesh network, where the message indicates a type of community-based game. For example, a designated community game server (e.g., gaming machine 238) transmits to one or more gaming machines a message indicating that it is serving a community based game (e.g., community game "A") on the mesh network. In one embodiment, the designated community game server transmits the message as a broadcast to all network devices. In other embodiments, the message is a multicast or a unicast message. The flow continues at block 1104.

At block 1104, an indication is received that a gaming device would like to join the community-based game. For example, the designated community game server receives an indication that gaming machine 230 would like to participate in the community-based game. The flow continues at block 1106.

At block 1106, the gaming machine's ability for joining the community-based game is verified. For example, the designated community game server verifies that gaming machine 230 is capable of joining the community-based game. In one embodiment, the designated community game server verifies security certificates of the specific gaming machine. In another embodiment, the designated community game server verifies that the gaming machine is properly configured for joining the community-based game. The flow continues at block 1108.

At block 1108, if the specific gaming machine is not capable of joining the community-based game, the flow ends. Otherwise, the flow continues at block 1110.

At block 1110, the community-based game is served to the specific gaming machine. For example, the designated community server serves the community-based game to gaming machine 230. From block 1110, the flow ends.

Just as community game servers can advertise for community members (see FIG. 11), community members can probe a mesh network for available community game servers. The discussion of FIG. 12 provides additional details about finding community game servers and participating in community games.

Figure 12:
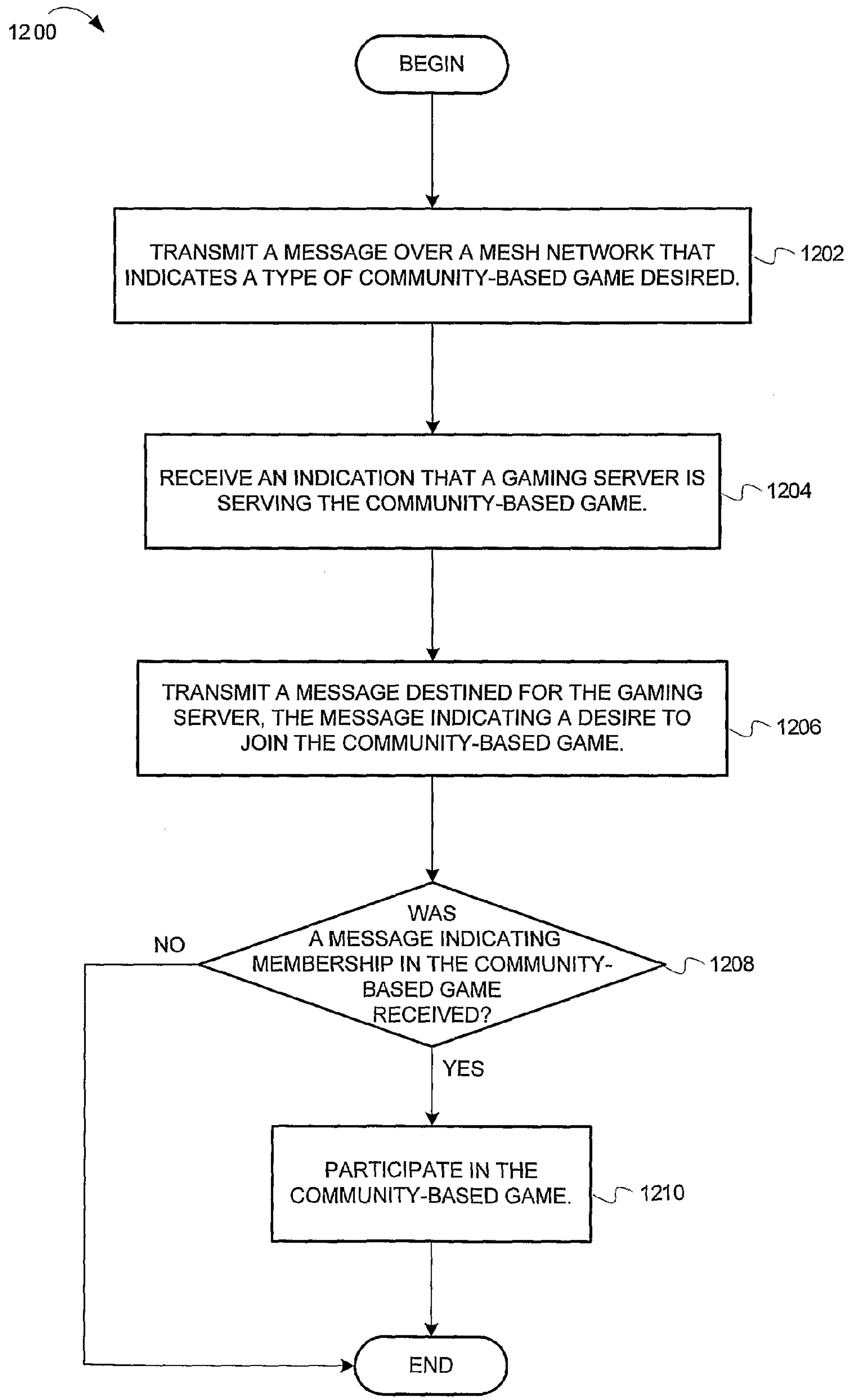
FIG. 12 is a flow diagram illustrating operations for requesting a community game server and participating in a mesh network, according to example embodiments of the invention.

FIG. 12 is a flow diagram illustrating operations for requesting a community game server and participating in a mesh network, according to example embodiments of the invention. The flow diagram 1200 commences at block 1202.

At block 1202, a message is transmitted over a mesh network, where the message indicates a type of community-based game that is desired. For example, gaming machine 238 transmits a message over the mesh network 200, where the message indicates that the gaming machine wants to join a particular community game type. In one embodiment, the gaming machine transmits the message as a broadcast. In other embodiments, the message is a multicast or a unicast. The flow continues at block 1204.

At block 1204, an indication is received, where the indication indicates that a specific gaming server is serving the desired community-based game type. For example, gaming machine 238 receives an indication that a specific gaming server is serving the desired community-based game type. In one embodiment the specific gaming server is identified by a MAC address or an IP address. In one embodiment, the indication originated at a neighboring gaming machine which had knowledge of the specific gaming server. In another embodiment, the indication originated at the specific gaming server. The flow continues at block 1206.

At block 1206, a message destined for the specific gaming server is transmitted, where the message indicates a desire to join the community-based game. For example, gaming machine 238 transmits a message destined for the specific gaming server, where the message indicates that gaming machine 238 would like to participate in the community-based game. In one embodiment, the message includes security certificates and/or configuration information that can help the specific gaming server determine whether to allow the gaming machine to participate in the community-based game. The flow continues at block 1208.

At block 1208, a determination is made about whether a message indicating membership in the community-based game has been received. For example, gaming machine 238 determines whether it received message from the specific gaming server, where the message indicates that the gaming machine 238 is a member of the community-based game. In one embodiment, the gaming machine does not receive the message from the specific gaming server. If a message indicating community membership is received, the flow continues at block 1210. Otherwise, the flow ends.

At block 1210, participation in the community game occurs. For example, gaming machine 238 participates in the community-based game served by the specific gaming server. From block 1210, the flow ends.

Routing Operations

This section describes operations for determining routing and topology information for a mesh gaming network. FIGS. 13-17 are described below.

Figure 13:
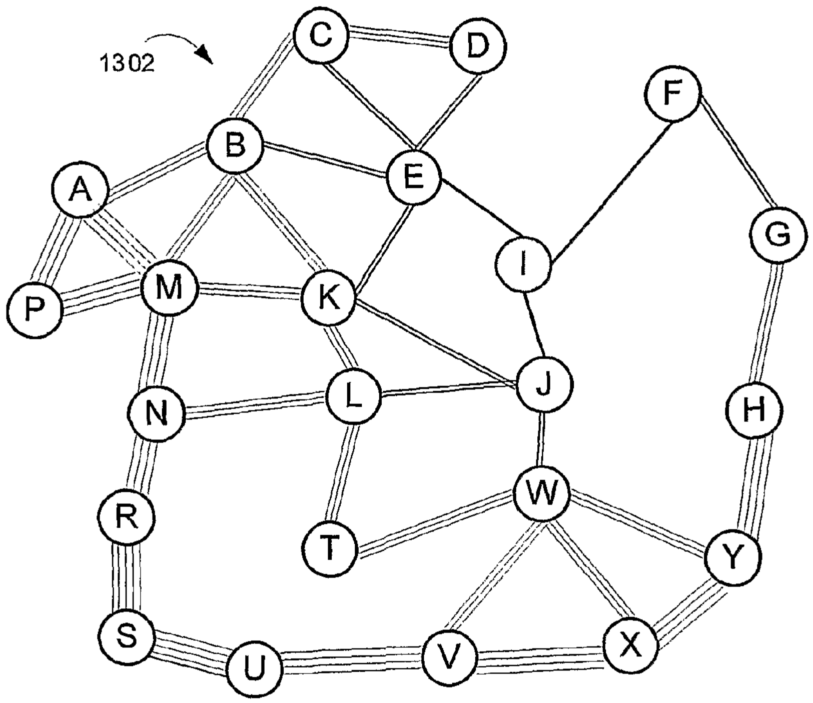
FIG. 13 presents graphical and tabular representations of topology and routing information for a mesh gaming network, according to example embodiments of the invention.
Figure 14:
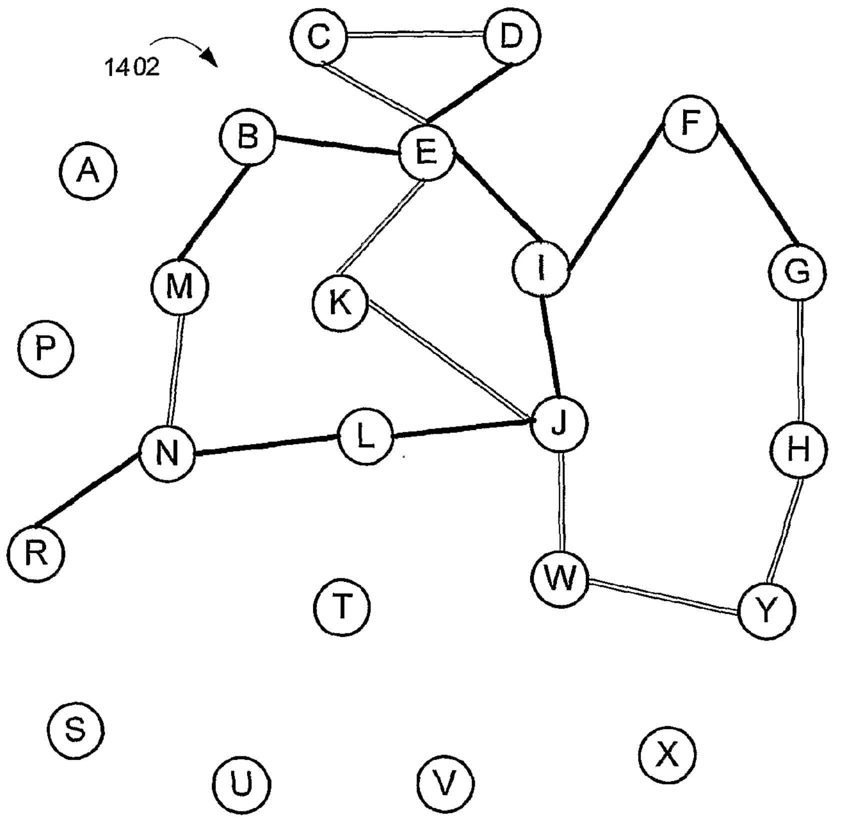
FIG. 14 presents graphical and tabular representations of routes between a community game server and gaming machines, according to example embodiments of the invention.

The topology of a mesh gaming network is often fluid. For example, mesh network topologies can change when operators add or relocate gaming machines, when mobile devices enter or leave the mesh, when gaming devices malfunction, etc. In order to maintain communications between mesh nodes, embodiments of the invention call for monitoring and maintaining network topology and routing information. FIGS. 13 and 14 describe some example topology and routing information.

FIG. 13 presents graphical and tabular representations of topology and routing information for a mesh gaming network, according to example embodiments of the invention. In FIG. 13, the mesh topology graph 1302 graphically represents routing information. The mesh topology graph 1302 includes 23 nodes, where each node represents a gaming device in a mesh gaming network.

The topology graph's nodes are connected by one or more edges, were each edge represents a number of hops to node "I". For example, there is a single edge connecting nodes E, J, and F to node I. Thus, nodes E, J, and F are one hop away from node I. As another example, there are two edges connecting node B to node E. Thus, the route from node B to node I takes two hops, so long as the route passes through node E.

The routing tables 1304 and 1306 provide tabular representations of the routing information shown in the mesh topology graph 1302.

FIG. 14 presents graphical and tabular representations of routes between a community game server and gaming machines, according to example embodiments of the invention. In FIG. 14, the community game routing graph 1402 graphically represents primary and secondary routes between a community game server (node I) and community game members (nodes D, E, G, J, M, and R). The community game routing graph 1402 includes 23 nodes. Nodes D, E, G, J, M, and R represent community member gaming machines, whereas node I represents the community game server. The other nodes represent gaming machines that are not part of the community game.

In the community game routing graph 1402, nodes connected by a single edge represent primary routes, while nodes connected by two edges represent secondary routes. For example, the primary route between nodes I and E runs directly from I to E. Note that nodes I and E are connected with a single edge. The secondary route between nodes I and E passes through nodes K and J. Nodes E, K, and J are connected with two edges.

The community game routing table 1404 is a tabular representation of the community game routing information shown in the graph 1402.

According to embodiments, mesh routers 433 and other network devices can create, maintain, and disseminate routing information like the information shown in FIGS. 13 and 14. Mesh routers can also update the routing information to reflect changes in the mesh topology. Operations for creating, maintaining, and disseminating routing information are described below in the discussion of FIGS. 15 and 16.

Figure 15:
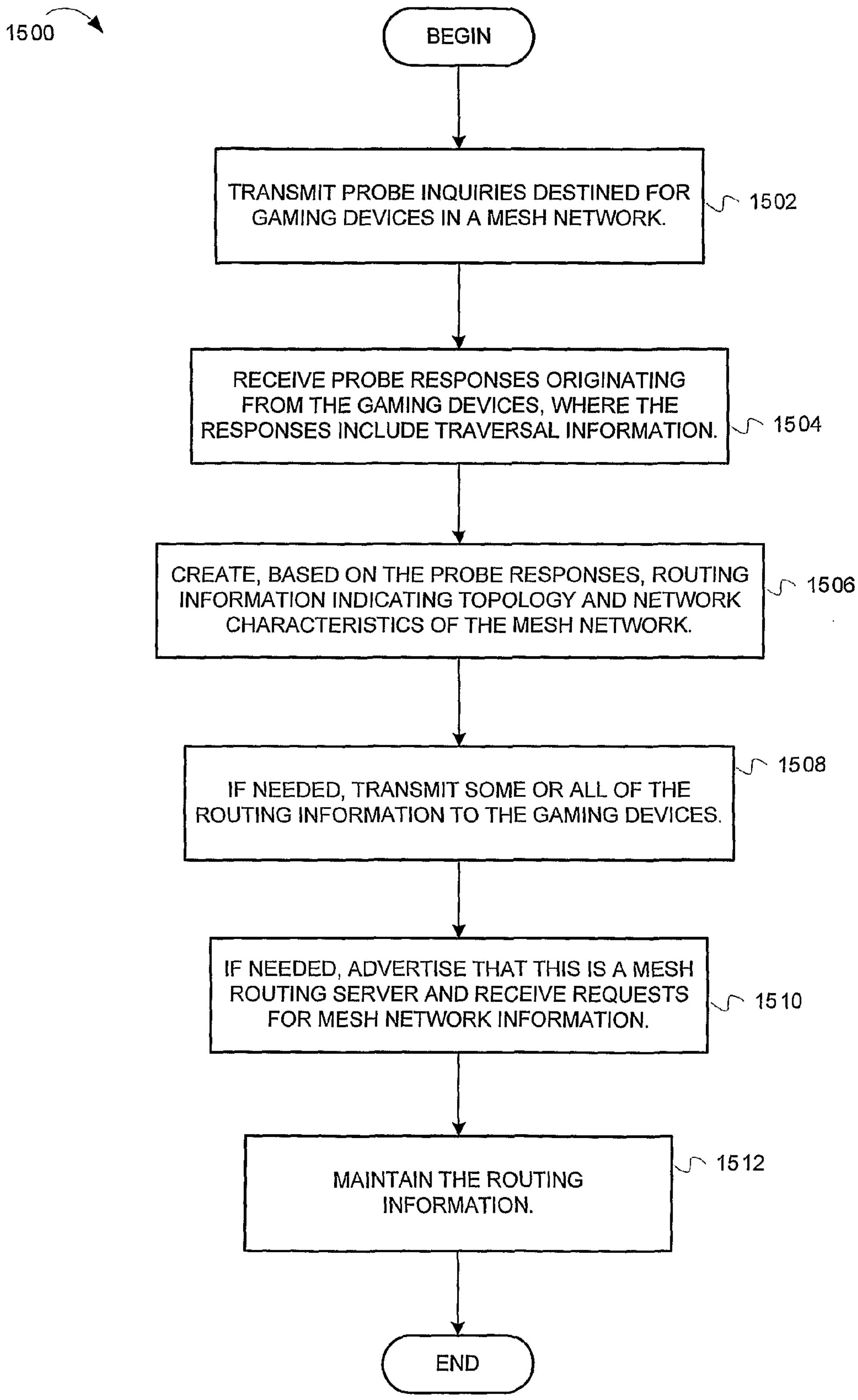
FIG. 15 is a flow diagram illustrating operations for creating and maintaining mesh routing information in a gaming system, according to example embodiments of the invention.

FIG. 15 is a flow diagram illustrating operations for creating and maintaining mesh routing information in a gaming system, according to example embodiments of the invention. The flow diagram 1500 commences at block 1502.

At block 1502, inquiries are transmitted to one or more gaming devices in a mesh network. For example, a gaming machine's mesh router (e.g., mesh router 433) transmits inquiries destined for gaming devices 210-240. In one embodiment, the mesh router 433 transmits the inquiries as a broadcast. In other embodiments, the mesh router 433 transmits the inquiries as a multicast or a unicast. Although FIG. 4 shows the mesh router 433 as part of a gaming machine, mesh routers can be integrated into any mesh network device, or they can be standalone devices. The flow continues at block 1504.

At block 1504, responses originating from the one or more gaming devices are received, where the responses include traversal information. For example, the mesh router 433 receives probe responses from gaming devices 210-240. In one embodiment, the responses include traversal information associated with the mesh network, such as hop count information and/or latency information. The flow continues at block 1506.

At block 1506, routing information indicating topology and network characteristics is created based on the responses. For example, the mesh router 433 creates, based on the responses, routing information indicating topology and network characteristics. In one embodiment, the routing information includes a routing table indicating routes between all devices in the mesh network. In one embodiment, the routing table includes hop counts and latencies between devices. The flow continues at block 1508.

At block 1508, if needed, some or all of the routing information is transmitted to some or all of the gaming devices. For example, the mesh router 433 transmits some or all of the routing information to some or all of gaming devices 210-240. In one embodiment, after initially determining the routing information, the mesh router 433 transmits the routing information to all the gaming devices. In another embodiment, the mesh router 433 transmits the routing information to gaming devices upon request. The flow continues at block 1510.

At block 1510, if it is needed, it is advertised that this is a mesh routing server and requests for mesh network information are received. For example, the mesh router 433 advertises that it is a mesh routing server and receives requests for mesh network information from mesh gaming devices. The flow continues at block 1512.

At block 1512, the routing information is maintained. For example, in one embodiment, the mesh router 433 maintains the routing information by repeating the operations of blocks 1502-1506. In another embodiment, the mesh router 433 can maintain the routing information by transmitting messages that traverse the mesh network and gather routing and topology information about the mesh network. In one embodiment, the maintaining includes recalculating paths as the mesh network changes (e.g., new gaming machines are added, mobile devices enter the mesh network).

In another embodiment, mesh agents (not shown) located on some or all of the network devices can maintain the routing information. The mesh agents can exchange messages to determine the mesh topology, routing latencies, whether links are up or down, and other suitable routing information. In one embodiment, the mesh agents operate independent of logic that maintains routing information (i.e., logic that performs the operation at block 1512).

In one embodiment, mesh agents compile mesh network information using a depth first searching method. The depth first searching method views the mesh network as a tree in which a root mesh agent requests routing information from its children. That is, a root mesh agent requests routing information from mesh agents that are one hop away. The children request routing information from their children (i.e., the root's grandchildren), which are two hops away from the root. The requests continue propagating until there are no more offspring of the root. Each mesh agent compiles routing information for all its children before responding to its parent's request for routing information. As the routing information propagates back to the root mesh agent, each mesh agent has routing information about all its own children, grandchildren, and so on.

From block 1512, the flow ends.

Figure 16:
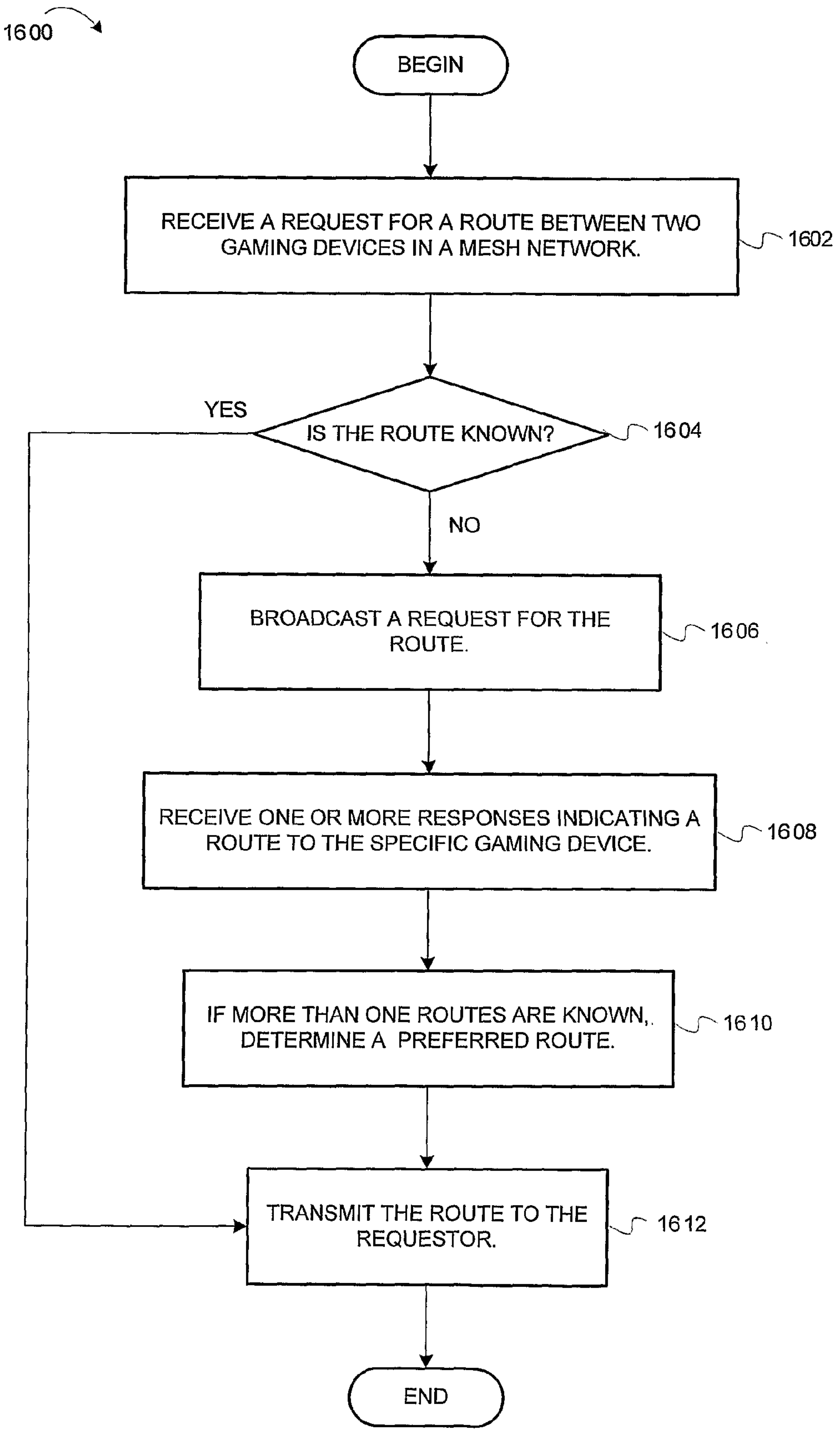
FIG. 16 is a flow diagram illustrating operations for determining a route between two devices in a mesh network, according to example embodiments of the invention.

FIG. 16 is a flow diagram illustrating operations for determining a route between two devices in a mesh network, according to example embodiments of the invention. The flow diagram 1600 commences at block 1602.

At block 1602, a request for a route between mesh network devices is received. For example, a mesh router 433 receives a request for a route between two gaming devices. The gaming devices can be identified by MAC address, IP address, or other identifier. In one embodiment the mesh router receives the request from a gaming application located on the same gaming device as the mesh router. The flow continues at block 1604.

At block 1604, a determination is made about whether the requested route is known. For example, the mesh router 433 determines whether there is a known route between the gaming devices. In one embodiment, the mesh router 433 searches a routing table created as a result of performing the operations shown in FIG. 15. If the route is known, the flow continues at block 1612. Otherwise, the flow continues at block 1606.

At block 1606, a request for the route is broadcast. For example, the mesh router 433 broadcasts a request for the route to all gaming devices on the mesh network 200. The flow continues at block 1608

At block 1608, one or more responses are received. For example, the mesh router 433 receives one or more responses, where each of the one or more responses indicates a route between the gaming devices. The responses can include partial routing information (e.g., next hop) or full routes between the devices. The flow continues at block 1610.

At block 1610, if more than one response is received, a best route is determined. For example, if more than one route is received, the mesh router 433 determines a best route. In one embodiment, the best route can be the route with the lowest hop count and/or shortest latency. The flow continues at block 1612.

At block 1612, the route is transmitted to the requester. For example, the mesh router 433 transmits the route to the requester. In one embodiment the mesh router 433 transmits the best route and an alternate route to the requester. From block 1612, the flow ends.

While the discussion of FIGS. 15 and 16 describe how mesh routers determine and disseminate routing information, the discussion continues with a description of how gaming devices can request and utilize the routing information.

Figure 17:
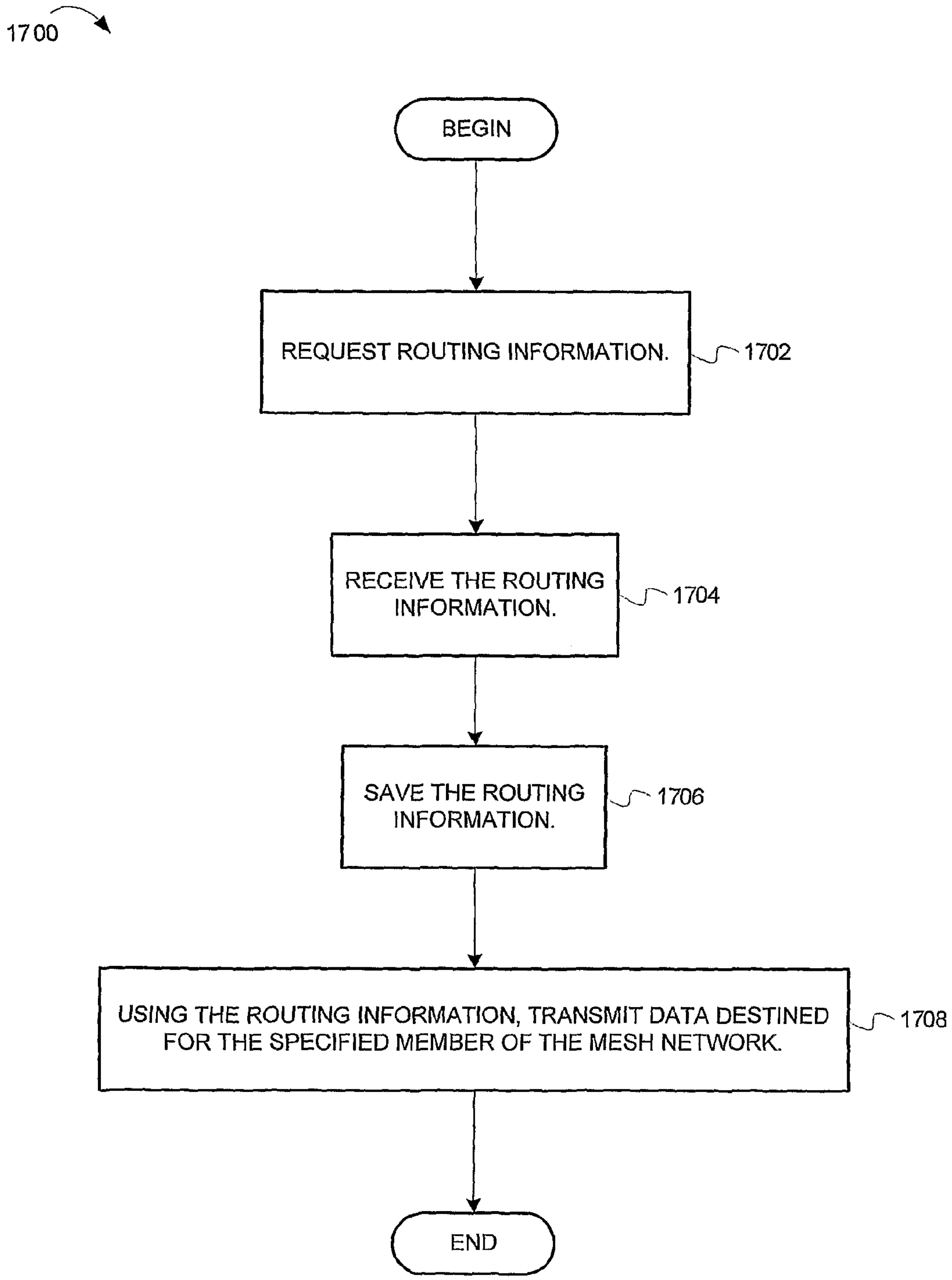
FIG. 17 is a flow diagram illustrating operations for a gaming mesh node requesting and receiving routing information, according to example embodiments of the invention.

FIG. 17 is a flow diagram illustrating operations for a gaming mesh node requesting and receiving routing information, according to example embodiments of the invention. The flow diagram 1700 commences at block 1702.

At block 1702, routing information is requested. For example, a gaming machine 222 requests routing information for another gaming machine 240 on the mesh network 200. In one embodiment, the gaming machine attempts to obtain the routing information from a neighboring mesh device. For example, the gaming machine 222 requests routing information from gaming machine 224. In another embodiment, the gaming device attempts to obtain the routing information from a mesh router, which may reside in gaming machine. The flow continues at block 1704.

At block 1704, the routing information is received. For example, the gaming machine 222 receives a routing table. The flow continues at block 1706.

At block 1706, the routing information is saved. For example, the gaming machine 222 saves the routing information in a persistent data store. The flow continues at block 1708.

At block 1708, the routing information is used for transmitting information to a particular gaming device. For example, the gaming machine 222 uses the routing information to transmit data destined for the mobile the gaming machine 240. From block 1708, the flow ends.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim constitutes an embodiment of the invention, and is incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram.

Although the flow diagrams depict serial operations, certain embodiments could perform certain of those operations in parallel. Additionally, although data is described herein as being transmitted from one device to another, the data can flow through any number of intermediate devices before arriving at the described destination.

The invention claimed is:

1. A community wagering game system comprising:

a wireless mesh network;

a set of gaming devices connected to the wireless mesh network, wherein the gaming devices are participants in a community wagering game;

an arbiter configured to receive routing information for each of the gaming devices of the set, the arbiter further configured to designate one of the gaming devices as a community wagering game server, wherein the designated gaming device includes:

a network interface unit to wirelessly receive gaming data from one or more of the other gaming devices of the set, and to wirelessly transmit the gaming data directly to one or more of the other gaming devices of the set;

a memory unit to store certain of the gaming data and to store instructions for conducting wagering games; and a central processing unit to perform operations based in part on the certain of the gaming data and to perform operations based on the instructions, wherein the central processing unit is operable to determine an outcome of the community wagering game.

2. The gaming device of claim 1, the network interface unit to perform the wireless transmission of the gaming data using a low-power radiofrequency signal.

3. The gaming device of claim 1, wherein the other gaming devices of the are located relatively near the gaming device designated as the community wagering game server.

4. The gaming device of claim 1, wherein the gaming data includes game themes, game settings, bonus events, pay tables, program code, audio content, or video content.

5. The gaming device of claim 1, wherein the gaming data includes executable game code, game math, game art, game configuration data, game operating system features, game peripheral device drivers, attract mode displays, advertisements, or episodic game content.

6. A computer-implemented method comprising:

inviting a set of gaming devices to participate in a community wagering game, the gaming devices connected to a wireless mesh network;

determining routing information for each gaming device of the set;

transmitting the routing information to an arbiter, wherein the arbiter designates one of the gaming devices of the set to act as a community wagering game server;

receiving an indication indicating which of the set will act as the community wagering game server, wherein the community wagering game server can determine an outcome of the continuity wagering game; and transmitting gaming information directly to the community wagering game server, associated with the designated gaming device, from at least one of the other gaming devices of the set.

7. The computer-implemented method of claim 6, wherein the gaming information includes player input for the community wagering game.

8. The computer-implemented method of claim 6, wherein the routing information for each gaming device indicates how efficiently the gaming device communicates with other gaming devices of the set.

9. The computer-implemented method of claim 6, wherein the routing information for each gaming device indicates a number of hops between the gaming device and other gaming devices of the set.

10. The computer-implemented method of claim 6, wherein the routing information for each gaming device indicates a transmission time of data sent from the gaming device to other gaming devices of the set.

11. The computer-implemented method of claim 6, wherein the transmitting the routing information to the arbiter includes using wireless low-power radiofrequency signals to propagate the routing information through a mesh network to the arbiter.

12. The computer-implemented method of claim 6, wherein the gaming devices are portable.

13. A computer-implemented method comprising:

inviting a set of gaming devices to participate in a community wagering game, the gaming devices connected to a wireless mesh network;

determining routing information for each gaming device of the set, wherein the routing information for each gaming device indicates a number of hops between the gaming device and other gaming devices of the set;

transmitting the routing information to an arbiter, wherein the arbiter designates one of the gaming devices of the set to act as a community wagering game server;

receiving an indication indicating which of the set will act as the community wagering game server, wherein the community wagering game server can determine an outcome of the community wagering game; and transmitting gaming information directly to the community wagering game server, associated with the designated gaming device, from at least one of the other gaming devices of the set.

* * * * *

UNITED STATES PATENT AND TRADEMARK OFFICE

CERTIFICATE OF CORRECTION

PATENT NO. : 8,447,870 B2
APPLICATION NO. : 11/996092
DATED : May 21, 2013
INVENTOR(S) : Gagner et al.

It is certified that error appears in the above-identified patent and that said Letters Patent is hereby corrected as shown below:

On the Title page, in column 2, under "Other Publications", line 1-2, delete ""International Search Report for Application No. PCT/US2006/27345, date mailed May 8, 2007", 4 pgs." and insert --"International Application No. PCT/US2006/27345, International Search Report mailed May 8, 2007", 4 pgs.--, therefor On the Title page, in column 2, under "Other Publications", line 3-5, delete ".. "Written Opinion of the International Searching Authority for Application No. PCT/US2006/27345, date mailed May 8, 2007"", 5 pgs." and insert --"International Application No. PCT/US2006/27345, Written Opinion mailed May 8, 2007", 5 pgs.--, therefor In the Specification In column 3, line 43, delete "gamine" and insert --gaming--, therefor In column 3, line 67, delete "others" and insert --other--, therefor In column 4, line 5, delete "radiofrequency" and insert --radio frequency--, therefor In column 4, line 65, delete "requester" and insert --requestor--, therefor In column 5, line 2, delete "requester" and insert --requestor--, therefor In column 6, line 7, delete "radiofrequency" and insert --radio frequency--, therefor In column 10, line 22, delete "at" and insert --and--, therefor In column 17, line 20, after "1608", insert --.--, therefor In column 17, line 35, delete "requester" and insert --requestor--, therefor Signed and Sealed this
Fifteenth Day of October, 2013

Teresa Stanek Rea
*Deputy Director of the United States Patent and Trademark Office*

In column 17, line 36, delete “requester” and insert --requestor--, therefor

In the Claims

In column 18, line 51, in Claim 1, after “game;”, insert --and--, therefor

In column 19, line 5, in Claim 2, delete “radiofrequency” and insert --radio frequency--, therefor In column 19, line 7, in Claim 3, after “the”, insert --set--, therefor In column 19, line 30, in Claim 6, delete “continuity” and insert --community--, therefor In column 20, line 15, in Claim 11, delete “radiofrequency” and insert --radio frequency--, therefor

UNITED STATES PATENT AND TRADEMARK OFFICE

CERTIFICATE OF CORRECTION

PATENT NO. : 8,447,870 B2
APPLICATION NO. : 11/996092
DATED : May 21, 2013
INVENTOR(S) : Gagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1434 days.

Signed and Sealed this
Eighth Day of September, 2015

Michelle K. Lee
*Director of the United States Patent and Trademark Office*